US011361400B1

(12) United States Patent
Kjoll et al.

(10) Patent No.: US 11,361,400 B1
(45) Date of Patent: Jun. 14, 2022

(54) FULL TILE PRIMITIVES IN TILE-BASED GRAPHICS PROCESSING

(71) Applicant: Arm Limited, Cambridge (GB)

(72) Inventors: Per Kristian Kjoll, Trondheim (NO); Ole Magnus Ruud, Oslo (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/313,968

(22) Filed: May 6, 2021

(51) Int. Cl.
*G06T 1/20* (2006.01)
*G06F 9/50* (2006.01)
*G06T 17/10* (2006.01)

(52) U.S. Cl.
CPC .............. *G06T 1/20* (2013.01); *G06F 9/5027* (2013.01); *G06T 17/10* (2013.01)

(58) Field of Classification Search
CPC .......... G06F 9/5027; G06T 1/20; G06T 17/10
USPC .................................................. 345/501, 506
See application file for complete search history.

(56) References Cited

U.S. PATENT DOCUMENTS

| | | | |
|---|---|---|---|
| 7,617,384 | B1 | 11/2009 | Coon |
| 8,074,224 | B1 | 12/2011 | Nordquist |
| 8,392,669 | B1 | 3/2013 | Nyland |
| 9,256,466 | B2 | 2/2016 | Nystad |
| 10,725,784 | B2 | 7/2020 | Elliott |
| 2005/0066149 | A1 | 3/2005 | Kanade |
| 2007/0150657 | A1 | 6/2007 | Mgzaw |
| 2007/0169030 | A1 | 7/2007 | Tarditi |
| 2008/0163220 | A1 | 7/2008 | Wang |
| 2009/0138683 | A1 | 5/2009 | Capps |
| 2009/0144519 | A1 | 6/2009 | Codrescu |
| 2009/0282410 | A1 | 11/2009 | Moir |
| 2009/0300621 | A1 | 12/2009 | Mantor |
| 2010/0088673 | A1 | 4/2010 | Chen |
| 2010/0281465 | A1 | 11/2010 | Krishnaswamy |
| 2011/0078692 | A1 | 3/2011 | Nickoils |
| 2012/0036329 | A1 | 2/2012 | Coon |
| 2013/0042090 | A1 | 2/2013 | Krashinsky |
| 2013/0262830 | A1 | 10/2013 | Gshwind |

(Continued)

FOREIGN PATENT DOCUMENTS

GB          2517047         2/2015

OTHER PUBLICATIONS

GB Search Report dated Jan. 22, 2016, GB Patent Application No. GB1511694.0.

(Continued)

*Primary Examiner* — Jacinta M Crawford
(74) *Attorney, Agent, or Firm* — Vierra Magen Marcus LLP

(57) ABSTRACT

A primitive that triggers performance of a graphics operation for the entirety of a tile is included in the sequence of primitives for a sequence of rendering tiles being provided to subsequent stages of the graphics processing pipeline for processing at least one tile in advance of the tile to which the primitive that is to trigger a graphics processing operation for the entirety of the tile relates. If, subsequent to the starting of the processing of the primitive that performs a processing operation for the entirety of the tile, it is determined that no other primitives will be processed for the tile, at least one of the subsequent processing stages of the graphics processing pipeline is caused to stop performing processing in respect of the primitive that performs a processing operation for the entirety of the tile.

20 Claims, 8 Drawing Sheets

(56) References Cited

U.S. PATENT DOCUMENTS

| | | |
|---|---|---|
| 2013/0275715 A1 | 10/2013 | Caprioli |
| 2013/0318507 A1 | 11/2013 | Breternitz |
| 2014/0129812 A1 | 5/2014 | Chakrabarti |
| 2014/0189260 A1 | 7/2014 | Wang |
| 2014/0310484 A1 | 10/2014 | Giroux |
| 2015/0026438 A1 | 1/2015 | Giroux |
| 2015/0046655 A1 | 2/2015 | Nystad |
| 2015/0046662 A1 | 2/2015 | Heinrich |
| 2015/0100764 A1 | 4/2015 | Tarolli |
| 2015/0128144 A1 | 5/2015 | Mansell |
| 2015/0378733 A1 | 12/2015 | Beylin |
| 2016/0260249 A1* | 9/2016 | Persson .................. G06T 11/40 |
| 2016/0314556 A1* | 10/2016 | Yang ......................... G06T 1/20 |
| 2016/0314618 A1* | 10/2016 | Yang ..................... G06T 15/005 |
| 2017/0139757 A1 | 5/2017 | Mansell |
| 2018/0089422 A1 | 3/2018 | Kounavis |
| 2018/0300139 A1 | 10/2018 | Que |

OTHER PUBLICATIONS

Balfour, CUDA Threads and Atomics, NVIDIA Research, Apr. 2011 (Year: 2011).

Wikipedia, Read-modify-write, (atomic operations), Feb. 2015 (Year: 2015).

Zhang, DAFT: Decoupled Acyclic Fault Tolerance, PACT'10, ACM, 2010 (Year: 2010).

* cited by examiner

FULL TILE PRIMITIVES IN TILE-BASED GRAPHICS PROCESSING

BACKGROUND

The technology described herein relates to graphics processing systems, and in particular to tile-based graphics processing systems.

Graphics processing is normally carried out by first splitting the scene to be displayed into a number of similar basic components or "primitives", which are then subjected to the desired graphics processing operations. The graphics "primitives" are usually in the form of simple polygons, such as triangles.

Each primitive is at this stage defined by and represented as a set of vertices. Each vertex for a primitive is associated with a set of data (such as position, colour, texture and other attributes data) representing the vertex. This data is then used, e.g., when rasterising and rendering the primitive(s) to which the vertex relates, in order to generate the desired render output of the graphics processing system.

Once primitives and their vertices have been generated and defined, they can be processed by the graphics processor to generate the desired render output, such as a frame for display.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the render output, e.g. frame to be displayed. This is typically done using the positions of the vertices of a primitive.

The rendering process then derives the data, such as red, green and blue (RGB) colour values and an "alpha" (transparency) value, necessary to represent the primitive at the sample points (i.e. "shades" each sample point). This can involve applying textures, blending sample point data values, etc.

FIG. 1 shows a typical computer graphics processing system, comprising a host processor (CPU) 1, a graphics processing unit (GPU) 3, and a memory 5 for storing data required by and/or generated by the host processor 1 and graphics processor 3.

When an application that is executing on the host processor 1 requires graphics processing from the graphics processor, such as a frame to be displayed, the application 2 will send appropriate commands and data to a driver 4 for the graphics processor that is running on the host processor 1.

The driver 4 will then send appropriate commands and data to the graphics processor 3 to cause it to generate the render output required by the application 2. The driver 4 sends commands and data to the graphics processor 3 by writing to data structures 6 in the memory 5, which data structures 6 are then read by the graphics processor 3.

The commands and data provided by the driver 4 will, inter alia, include commands to "draw" primitives to be rendered for the render output to be generated by the graphics processor 3, together with associated vertex data representing the vertices to be used for the primitives for the render output.

The commands sent to the graphics processor 3 cause the graphics processor 3 to, inter alia, read and process the vertex data to generate the render output. The graphics processor 3 will typically use the vertex data for a primitive to rasterise the primitive to one or more fragments each (potentially) applying to a region (area) of the render output. The fragments will then be rendered.

The completed render output (e.g. frame) may be written in a frame buffer 7 in the memory 5, from where it may, e.g., be provided for display on a display device, such as a screen or printer.

Some graphics processing systems use so-called "tile-based" rendering. In tile-based rendering, the two dimensional render output (i.e. the output of the rendering process, such as an output frame to be displayed) is rendered as a plurality of smaller area sub-regions, usually referred to as "tiles". The tiles are each rendered separately (typically one after another). The rendered tiles are then recombined to provide the complete render output (e.g. frame for display). In such arrangements, the render output is typically divided (by area) into regularly sized and shaped rendering tiles (they are usually, e.g. squares or rectangles).

Other terms that are commonly used for "tiling" "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

In tile-based graphics processing, the geometry (primitives) for the render output being generated is sorted into respective regions of the render output. This process identifies primitives that need to be processed for a given region of the render output (and thus rendering tile(s)) (so as to, e.g., avoid unnecessarily rendering primitives that are not actually present in a tile), and produces lists of primitives to be processed (rendered) for respective regions (areas) of the render output. Then, once the primitive lists have been prepared for the render output regions, each rendering tile is processed, by rasterising and rendering the primitives listed for the region(s) that encompass the rendering tile. The regions of the render output that primitive lists can be prepared for can correspond, e.g., to single rendering tiles or to sets of plural rendering tiles.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
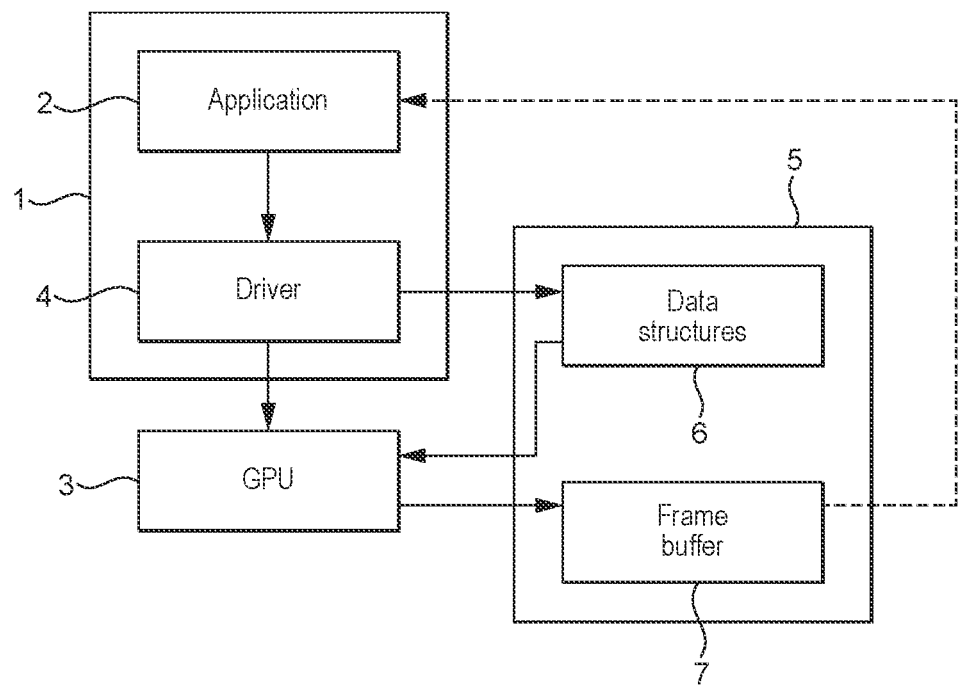
FIG. 1 shows an exemplary graphics processing system which may be operated in accordance with an embodiment of the technology described herein.

The Applicants believe that there remains scope for improvements to tile-based graphics processing and processors.

A first embodiment of the technology described herein comprises a method of operating a graphics processor when generating a render output using tile-based rendering, in which a plurality of tiles for a render output being generated are rendered separately, and the rendered tiles combined to form the render output, the graphics processor being operable to execute a graphics processing pipeline, the graphics processing pipeline including at least a primitive providing stage and one or more subsequent processing stages, wherein the primitive providing stage is operable to provide primitives to be processed for respective rendering tiles of a sequence of rendering tiles to the one or more subsequent processing stages for processing, and the one or more subsequent processing stages are operable to perform one or more processing operations in respect of primitives provided for processing by the primitive providing stage; the method comprising:

the primitive providing stage, when providing primitives to be processed for respective tiles of a sequence of plural rendering tiles to the one or more subsequent processing stages of the graphics processing pipeline for processing:

for a tile of the sequence of plural rendering tiles, including in the sequence of primitives for the sequence of rendering tiles being provided to the one or more subsequent processing stages of the graphics processing pipeline for processing, a primitive that will trigger the performance of a graphics processing operation for the entirety of the tile, and having associated with it a condition such that the graphics processing operation to be performed for the entirety of the tile should only be performed if another primitive is to be processed for the tile to which the primitive that is to trigger a graphics processing operation for the entirety of the tile relates;

the primitive that will trigger the performance of a graphics processing operation for the entirety of the tile being included in the sequence of primitives for the sequence of rendering tiles at least one tile in advance of a tile to which the primitive that is to trigger a graphics processing operation for the entirety of the tile relates;

the method further comprising:

a subsequent processing stage of the graphics processing pipeline processing the primitive that is to trigger the performing of a graphics processing operation for the entirety of the tile to which the primitive relates, without waiting for any determination of whether any other primitives will be processed for that tile; and when, subsequent to the starting of the processing of the primitive that performs a processing operation for the entirety of the tile, it is determined that no other primitives will be processed for the tile to which the primitive that performs a processing operation for the entirety of the tile relates, causing at least one of the one or more subsequent processing stages of the graphics processing pipeline to stop performing processing in respect of the primitive that performs a processing operation for the entirety of the tile.

A second embodiment of the technology described herein comprises a graphics processor operable to generate a render output using tile-based rendering, in which a plurality of tiles for a render output being generated are rendered separately, and the rendered tiles combined to form the render output, the graphics processor being operable to execute a graphics processing pipeline;

the graphics processing pipeline executed by the graphics processor comprising:

a primitive providing circuit configured to provide primitives to be processed for respective rendering tiles of a sequence of rendering tiles to one or more subsequent processing stages of the graphics processing pipeline for processing; and one or more processing stages operable to perform one or more processing operations in respect of primitives provided for processing by the primitive providing circuit subsequent to the primitive providing circuit;

wherein:

the primitive providing circuit is operable to, when providing primitives to be processed for respective tiles of a sequence of plural rendering tiles to the one or more subsequent processing stages of the graphics processing pipeline for processing:

for a tile of a sequence of plural rendering tiles, include in the sequence of primitives for the sequence of rendering tiles being provided to the one or more subsequent processing stages of the graphics processing pipeline for processing, a primitive that will trigger the performance of a graphics processing operation for the entirety of the tile, and having associated with it a condition such that the graphics processing operation to be performed for the entirety of the tile should only be performed if another primitive is to be processed for the tile to which the primitive that is to trigger a graphics processing operation for the entirety of the tile relates; and include the primitive that will trigger the performance of a graphics processing operation for the entirety of the tile in the sequence of primitives for a sequence of rendering tiles at least one tile in advance of a tile to which the primitive that is to trigger a graphics processing operation for the entirety of the tile relates;

and the graphics processor is configured such that:

a subsequent processing stage of the graphics processing pipeline, when it receives a primitive that is to trigger the performing of a graphics processing operation for the entirety of the tile to which the primitive relates, will process the primitive that is to trigger the performing of a graphics processing operation for the entirety of the tile to which the primitive relates, without waiting for any determination of whether any other primitives will be processed for that tile;

and such that:

when, subsequent to the starting of the processing of a primitive that performs a processing operation for the entirety of a tile, it is determined that no other primitives will be processed for the tile to which the primitive that performs a processing operation for the entirety of the tile relates, at least one of the one or more subsequent processing stages of the graphics processing pipeline will be caused to stop performing processing in respect of the primitive that performs a processing operation for the entirety of a tile.

The technology described herein is concerned with tile-based graphics processing and graphics processors, in which sequences of tiles (and primitives for those tiles) are sent through a graphics processing pipeline for processing (such that the tiles will, for example, be generated one after another). Thus in the technology described herein, a sequence of plural tiles (and primitives for those tiles) is passed to and through a graphics processing pipeline, in order to generate a corresponding sequence of rendered output tiles.

In the technology described herein, it is possible to provide primitives that trigger the performance of a graphics processing operation for the entirety of a rendering tile. This may be useful, for example, to preload data values for the tile that will then be used when rendering "actual" primitives for the tile. For example, it may be desirable to populate in advance the depth (Z) and/or stencil (S) buffer for a tile, for example with a set of default and/or previously determined values. The use of a single primitive that triggers an operation (such as the loading of depth values) for the entirety of a tile facilitates performing such "preloading" operations in a more efficient manner.

The Applicants have recognised that while such "full tile" primitives can be used to perform some initial operations for a tile in a more efficient manner, there may in fact be circumstances where the full tile operation may not in fact be necessary, for example, because there may in practice be no "actual" primitives to be processed for a tile (which can be a relatively common occurrence). In such cases, any performing of the "full tile" operation in response to the "full tile" primitive would then be unnecessary and redundant. The technology described herein therefore allows for a "full tile" primitive to be "conditionally" processed, namely to set that the "full tile" primitive operation should only be performed when other primitives are to be processed for the tile.

The Applicants have further recognised in this regard that in the case where such a "conditional" full tile primitive is issued at the beginning of the tile to which that primitive actually relates, it would then be relatively straightforward to wait and see whether any "actual" primitives also fall to be processed for the tile, before triggering the "full tile" primitive processing. In that case therefore, the "full tile" primitive can simply be stalled at an appropriate point in the graphics processing pipeline until another, "actual" primitive to be processed arrives.

However, the Applicants have further recognised in this regard, that where the operation triggered by "full tile" primitive relates, for example, to preloading data needed for the tile, it would be desirable to issue and process that primitive in advance of the actual tile to which it relates (i.e. such that the preloaded data should (hopefully) have already been loaded by the time any "actual" primitives for the tile in question fall to be processed). In this case therefore, the "full tile" primitive may be issued one or more tiles in advance of the actual tile that it applies to. In this case therefore, if the "full tile" primitive was then stalled until such time as an actual primitive for the tile to which it relates fell to be processed, that could potentially also stall (and require buffering of) primitives for one or more intervening tiles, which would be undesirable.

To allow for this, in the technology described herein, rather than stalling the "conditional" full tile primitive until it is determined that an actual primitive for the tile to which the full tile primitive relates will be processed, the full tile primitive is instead processed anyway, without waiting for any determination of whether any other primitives will need to be processed for the tile in question, but then thereafter, in the event that it can be determined that no primitives will need to be processed for the tile to which the full tile primitive relates, remaining processing relating to the full tile primitive (which will accordingly be redundant) is then (attempted to be) stopped.

The effect of this then is that there is no need to buffer and stall a large number of primitives (e.g. for intervening tiles) whilst waiting to determine whether the processing of the full tile primitive is actually necessary, but on the other hand, the system can then still opportunistically cull and stop any remaining processing for the full tile primitive in the case where it can later be determined that the processing for that primitive is unnecessary. Furthermore, and as will be discussed further below, the Applicants believe that in general it should be reasonably possible to later determine that the processing of the full tile primitive is not necessary (where that is the case) in sufficient time to stop a relatively large amount of any unnecessary processing for the full tile primitive, notwithstanding that processing of the full tile primitive has already been allowed to proceed. Thus the technology described herein can still achieve at least reasonable elimination of unnecessary processing for full tile primitives (where that is not necessary to do), but without the need to, for example, stall and/or buffer large amounts of primitives and processing in the graphics processing pipeline.

The render output that is being generated in the technology described herein can be any suitable and desired render output to be generated (rendered) by the graphics processor. The render output to be generated (rendered) by the graphics processor may typically be a frame intended for display on a display device, such as a screen or printer, but may also, for example, comprise intermediate data intended for use in later rendering passes (also known as a "render to texture" output), etc.

The render output will typically be represented as a (rectangular) array of sampling positions, e.g. representing an image, wherein generating (rendering) the render output includes the graphics processor determining the colour (or greyscale) value to be used for each sampling position of the render output (frame).

The technology described herein relates to tile-based graphics processing. Thus the render output (area) is accordingly divided into plural rendering tiles for rendering purposes (is processed on a tile by tile basis (by the graphics processor)).

The tiles that the render output may be divided into for rendering purposes can be any suitable and desired such tiles. Each tile should, and in an embodiment does, correspond to a respective area of the render output. The size and shape of the rendering tiles may normally be dictated by the tile configuration that the graphics processor is configured to use and handle.

The rendering tiles are in an embodiment all the same size and shape (i.e. regularly sized and shaped tiles are in an embodiment used), although this is not essential. The tiles are in an embodiment rectangular and in an embodiment square. The size and number of tiles can be selected as desired. In an embodiment each tile is 16×16, or 32×32 sampling positions in size (with the render output then being divided into however many such tiles as are required for the render output size and shape that is being used).

In the technology described herein the primitive providing stage (circuit) will provide primitives to be processed for respective tiles of a sequence of plural rendering tiles to the subsequent processing stages of the graphics processing pipeline for processing. Thus, for example, and in an embodiment, the primitive providing stage (circuit) will provide to the subsequent processing stages of the graphics processing pipeline a set (sequence) of primitives for a first tile to be processed, followed by a set (sequence) of primitives for a next tile to be processed, followed by a set (sequence) of primitives for a next tile to be processed, and so on.

In an embodiment, the start and end of each tile in the sequence is indicated to one or more of the subsequent processing stages of the graphics processing pipeline. This can be done in any suitable and desired manner, for example, and in an embodiment, by including appropriate "start of tile" and/or "end of tile" indications (markers, e.g. commands) in the sequence of primitives provided by the primitive providing stage (circuit). Explicit (and distinct) start and end of tile markers could be used in this regard, or there could, for example, simply be a (single) indication to denote the boundary between tiles, such as using only a start or only an end tile marker to indicate the start/end of a tile (and correspondingly the end of the previous tile/start of the next tile).

Thus, the primitive providing stage (circuit) in an embodiment also includes start of tile and/or end of tile markers in the sequence of primitives that it sends to the subsequent processing stages of the graphics processing pipeline.

In an embodiment, both explicit (and distinct) start and end of tile markers and single markers (e.g. start markers) only can be used to denote and separate tiles in the sequence. In an embodiment, one type of tile in the sequence is denoted using (and uses) explicit start and end of tile markers, but another type of tile in the sequence only uses a single marker to denote such tiles. In an embodiment, tiles that include primitives read from primitive lists are denoted using start of tile and end of tile markers in the sequence, but the tiles that include a primitive that would trigger the performance of a graphics processing operation for the entirety of a tile only use a start tile marker to denote the presence of such tiles in the sequence. Other arrangements would, of course, be possible.

The primitive providing stage (circuit) can be any suitable and desired graphics processing stage (circuit) (of the graphics processing pipeline) that can provide primitives for processing to subsequent processing stages of the graphics processing pipeline.

In an embodiment the primitive providing stage (circuit) comprises, at least in part, a primitive list reading stage (circuit) that can and is configured to read lists of primitives prepared for respective regions of a render output being generated to determine primitives to be processed for a rendering tile, and then pass the primitives for the rendering tile to the one or more (subsequent) stages of the graphics processing pipeline for processing accordingly.

Correspondingly, in an embodiment, the graphics processor and graphics processing pipeline includes (prior to the primitive providing stage (circuit)), a primitive list preparing stage (circuit) (a "tiler") that prepares primitive lists for respective regions of the render output, and the primitive list reader then reads the primitive lists prepared by the primitive list preparing stage ("tiler"), and passes those read primitives to the one or more (subsequent) stages of the graphics processing pipeline for processing.

In this case, the regions of the render output that the primitive list preparing stage ("tiler") can prepare primitive lists can in an embodiment correspond to single rendering tiles, and/or to sets of plural rendering tiles (e.g. in the case of "hierarchical tiling" arrangements). Accordingly, depending on how primitives are listed, the primitive list reader may read primitives for any particular rendering tile from a single primitive list or from plural primitive lists.

The primitive list preparing storage ("tiler") may use, e.g., exact binning or bounding box binning, as desired.

In an embodiment, the primitive providing stage (circuit) also includes a resource allocator (a resource allocation circuit) that is operable to and configured to receive primitives from the primitive list reader, to allocate necessary resources of the graphics processor and graphics processing pipeline for processing those primitives, and to then provide the primitives to the one or more subsequent stages of the graphics processing pipeline for processing.

In the technology described herein, as well as providing sequences of primitives to be processed for respective tiles of a sequence of plural rendering tiles to the one or more subsequent processing stages of the graphics processing pipeline for processing (e.g., and in an embodiment, based on primitive lists corresponding to respective regions, e.g. rendering tiles, of the render output being generated), the primitive providing stage (circuit) is also able to and operable to include in the sequence of primitives for a sequence of rendering tiles being provided to the one or more subsequent processing stages of the graphics processing pipeline for processing, primitives that trigger the performance of a graphics processing operation for the entirety of a rendering tile.

The graphics processing operation that a "full-tile" primitive performs for the entirety of a tile can be any suitable and desired graphics processing operation.

It should be an operation that is to be performed before the processing of any "actual" primitives for the tile in question (as it is inserted in the sequence of tiles and primitives before any "actual" primitives for the tile in question), but otherwise can be any suitable and desired operation that is to be performed before the processing of actual primitives for a tile (and for the tile in its entirety).

In an embodiment, the graphics processing operation that the full tile primitive performs is an operation that loads (sets) data values for the entirety of the tile (i.e. it is an operation that "preloads" data values for the tile). These data values could be any suitable and desired data values for the tile, such as data values that are to be used when processing other primitives for the tile and/or data values that directly affect the output for the tile.

In one embodiment, the graphics processing operation (directly) affects (writes to) sampling positions of the render output.

For example, the graphics processing operation may be an operation that sets the value for each sampling position for a tile to a respective, particular, in an embodiment selected, in an embodiment predetermined, value. In this case the sampling positions for the tile may be set to different values to each other, or each sampling position for the tile may be set to the same value (as the value for each other sampling position).

This may be used, for example, for a background loading operation, in which a background image or pattern for the entire tile is loaded.

In an embodiment, the graphics processing operation sets data values associated with the render output, but which are not the render output itself, in respect of the entire area of the tile (for all sampling positions in the tile). In this case, the graphics processing operation is in an embodiment an operation which sets depth values and/or stencil values and/or other values that the graphics processor uses to generate the render output. (In such embodiments, the "full tile" graphics processing operation accordingly will indirectly affect the render output.)

Thus, in an embodiment, the graphics processing operation that the "full-tile" primitive performs is an operation to load data values that will then be used when rendering the "actual" primitives for the tile (if any). In this case, the operation could, e.g., be to load a set of previously determined data values (e.g. from a previous rendering pass), and/or a set of predefined, e.g. default values. It could also be used, if desired, to "clear" a set of data values prior to processing a tile.

In an embodiment, the graphics processing operation is to load depth and/or stencil values for the tile in question, i.e. to populate the depth and/or stencil buffer with a set of values for the tile in advance of "actual" primitives being processed for the tile. Thus, in an embodiment, the graphics processor and graphics processing pipeline is operable to store depth and/or stencil values for a tile in a depth and/or stencil buffer, and the graphics processing operation that is performed by the "full-tile" primitive comprises loading depth and/or stencil values into the depth and/or stencil buffer.

It would be possible in the technology described herein to include a "full-tile" primitive for only a single tile of the sequence of tiles being rendered for a given render output (e.g. frame) (and in one embodiment, that is what is done).

However, in an embodiment, "full-tile" primitives are included for plural rendering tiles in the sequence of tiles being rendered for a given render output (e.g. frame). In this case therefore, there will be plural "full-tile" primitives included in the sequence of primitives for the sequence of rendering tiles for a render output, each, e.g., relating to a respective later rendering tile in the sequence.

In an embodiment, a "full-tile" primitive is issued and included for each rendering tile for a render output (for the render output in question) (e.g. frame). In this case therefore, there will be a (one) full tile primitive issued for each tile making up the render output (e.g. frame) in question. This may be done, e.g., where the graphics processing operation is to be applied to (performed for) the render output (e.g. frame) as a whole (for the entire render output (e.g. frame)), for example where it is desired to pre-load depth or other values for a frame.

The primitive that will trigger the performance of a graphics processing operation for the entirety of a rendering tile can be included in the sequence of primitives for a sequence of rendering tiles by any suitable and desired element (e.g. component) of the primitive providing stage (circuit).

Where the primitive providing stage (circuit) includes a resource allocator, then in an embodiment, the resource allocator operates to (and is configured to) include the primitives that will trigger the performance of a graphics processing operation for the entirety of a tile in the sequence of primitives for the sequence of rendering tiles being provided to the one or more subsequent processing stages of the graphics processing pipeline. In this case therefore, the resource allocator will, for example, and in an embodiment, receive sequences of tiles and primitives to be rendered for those tiles, e.g., and in an embodiment, from the primitive list reader, and then insert "full tile" primitives at appropriate positions before and in that received sequence of tiles and primitives.

A primitive that will trigger the performance of a graphics processing operation for the entirety of a rendering tile can be included at any suitable and desired position in the sequence of primitives for a sequence of rendering tiles. As discussed above, the primitive that will trigger the performance of graphics processing operation for the entirety of a rendering tile should be, and is in an embodiment, included in the sequence of primitives for the sequence tiles ahead of any "actual" primitives for the rendering tile in question (as it should, and in an embodiment does, trigger a graphics processing operation that is to be performed before (prior to) rendering any "actual" primitives for the tile in question). Other than this, the "full tile" primitive can be included at any suitable and desired position in the sequence of primitives for a sequence of rendering tiles. For example, it may be included at the beginning of the sequence of primitives for a given (different) rendering tile, for example, and in an embodiment, before any primitives read from primitive lists for the rendering tile, and in an embodiment immediately following the start of tile/end of previous tile marker (if any).

In an embodiment, a (at least one) primitive that will trigger the performance of a graphics processing operation for the entirety of a rendering tile is included in the sequence of primitives for a sequence of rendering tiles by including it in the sequence between other (different) rendering tiles in the sequence (i.e. in between rendering tiles to which the "full tile" primitive does not relate). In this case therefore, the "full tile" primitive will be included in the sequence of rendering tiles by including it between respective rendering tiles in the sequence.

In an embodiment the "full tile" primitive is included in and as a separate tile (as a standalone tile) (which will simply trigger the rendering of the full tile primitive) in the sequence of rendering tiles, i.e. such that the sequence of rendering tiles includes a distinct tile to be rendered, for which the primitive to be rendered is the full tile primitive, separate to (e.g. in between) other tiles in the sequence. In this case therefore, there may be a tile boundary indicating the end of the previous tile, followed by a tile for the "full tile" primitive, followed by an indication indicating the boundary between the "full tile" primitive tile and the next tile in the sequence. For example, and in an embodiment, the full tile primitive may be inserted after a start of tile marker, identifying the start of the tile with which the full tile primitive is associated, and be followed by a start of tile marker for the next tile in the sequence.

Thus, in an embodiment, an "additional" tile is inserted in the sequence of rendering tiles that has associated with it the full tile primitive (and indicates the tile to which the full tile primitive applies). In an embodiment this additional tile in the sequence to trigger of the processing of the full tile primitive has only the full tile primitive associated with it (contains only the full tile primitive) (and does not have associated with it or include any other primitives (whether for the tile that the full tile primitive relates to or otherwise)).

In an embodiment therefore, where a "full tile" primitive is to be processed for a tile, there will in an embodiment be an additional tile inserted in the sequence of rendering tiles that is to trigger the processing of the full tile primitive for the tile in question, which will then be followed by another tile in the sequence that will trigger (and have listed for it) any other primitives to be processed for the tile (e.g., and in an embodiment, as read from the primitive list or lists for the tile in question). There should also in this case, and in an embodiment, be one or more intervening tiles in the sequence between the tile for the full tile primitive, and the later tile for the other primitives (if any) for the tile to which the full tile primitive relates.

In this case therefore, there will, in effect, be, and in an embodiment is, two instances of the tile to which the full tile primitive relates included in the sequence of rendering tiles, an earlier instance of the tile that solely triggers the processing of the "full tile" primitive for the tile, and then a later instance of the tile in the sequence that will include and trigger the processing of any primitives read from primitive lists for the tile in question.

Thus in an embodiment, the method of the technology described herein comprises (and the primitive providing stage (circuit) is configured to), when a full tile primitive is to be used for a tile, include that tile twice in the sequence of rendering tiles that is provided to the subsequent stages of the graphics processing pipeline, with the first instance of the tile triggering the processing of the full tile primitive for the tile, and then a later (second) instance of the tile triggering the processing of any primitives read from primitive lists for the tile in question.

The instance of the tile that is to trigger the processing of the full tile primitive should, and in an embodiment does, only list the full tile primitive for the tile (i.e. will not include nor trigger the processing of any primitives read from a primitive list for the tile in question (or for any other tile)).

In an embodiment, each tile for a render output (e.g. frame to be displayed) has a respective identifier, e.g. tile index, that identifies the tile in the render output. In this case therefore, where there are two instances of a given tile included in the sequence of rendering tiles for a render output, an earlier instance of the tile that solely triggers the processing of a "full tile" primitive for the tile, and then a later instance of the tile to trigger the processing of any primitives read from primitive lists for the tile in question, both instances of the tile will be indexed with the same tile index (identifier) to indicate that they relate to the same tile of the render output, but the primitives that are included in the sequence for each different instance of the tile will be different.

Other arrangements would, of course, be possible.

In the technology described herein, a primitive that will trigger the performance of a graphics processing operation for the entirety of a rendering tile is (where possible) included in the sequence of primitives for a sequence of rendering tiles in advance of the rendering tile that it relates to (is to be processed for), i.e. such that it will be present in the sequence of primitives for the sequence of rendering tiles in advance of any primitives read from a primitive list for the rendering tile in question.

The primitive that will trigger the performance of a graphics processing operation for the entirety of a rendering tile should be, and is in an embodiment, included in the sequence of primitives for the sequence of rendering tiles at least one tile in advance of the rendering tile to which that "full tile" primitive actually applies, i.e. such that the sequence of primitives for the sequence of rendering tiles will include the "full tile" primitive, followed by one or more other tiles (and any primitives for those tiles) that the "full tile" primitive does not relate to, followed by the rendering tile that the "full tile" primitive does relate to.

In other words, the full tile primitive will be received by the subsequent processing stages for processing before other primitives for the tile in question (if any), and the subsequent processing stages will receive the "full tile" primitive followed by one or more (primitives for) different tiles, before receiving (any other (further) primitives for) the tile to which the "full tile" primitive relates.

There should be at least one "intervening" tile between the "full tile" primitive and the tile to which it relates in the sequence of rendering tiles being provided to the one or more subsequent processing stages of the graphics processing pipeline. There could only be a single intervening tile in this manner, but in an embodiment there are plural intervening tiles.

In general, a "full tile" primitive is in an embodiment included in the sequence of rendering tiles sufficiently far in advance of the tile to which it relates so as to (try to) hide any latency of the, e.g. preloading, operation that the full tile primitive performs (i.e. such that when the second instance of the tile containing the "actual" primitives for the tile arrives, all of the desired data should have been preloaded, such that stalling of the processing of the actual primitives for the tile in question should (hopefully) be avoided). This may depend on a number of factors, such as how long any processing of any intervening tiles may take (e.g. how many actual primitives there are in those tiles, and the processing (e.g. fragment shading) that they are to undergo).

In general it is preferred to try to insert any "full tile" primitive tiles as early as possible in the sequence of tiles for a render output.

In an embodiment, there is a limit on the number of "full tile" primitive tiles that can be issued ("in flight") at any given time.

Thus, in an embodiment, there is a particular, in an embodiment selected, and in an embodiment predefined, maximum number of "full tile" primitive tiles can be active at any given time, and the primitive providing stage (circuit) is configured to (try to) ensure that that maximum number of "full tile" primitive tiles is not exceeded, e.g., and in an embodiment, by not issuing any further "full tile" primitive tiles into the sequence once the maximum number of such tiles has been reached, unless and until an earlier issued "full tile" primitive tile has been finished with (e.g. because it has completed its processing or it has otherwise been discarded, e.g. in the manner of the technology described herein).

This may help, for example, to avoid deadlocks occurring where a tile with "actual" primitives for an early "full tile primitive" tile is unable, for example, to gain access to the tile buffer because there is not space for it in the tile buffer, such that the earlier "full tile" primitive tile would then never be released. Thus, in an embodiment, the maximum permitted number of "active" full tile primitive tiles is based on and set in dependence on the (maximum) capacity of the relevant buffers that will be storing the data that will be "preloaded" by the full tile primitives, such as on the number of buffers (e.g. ZS buffers) that the graphics processor and graphics processing pipeline supports (e.g. for the render output in question).

It should also be noted here that the intervening tiles between a "full tile primitive" tile and the tile that triggers the rendering of the actual primitives for that tile in the sequence of rendering tiles may be other "full tile" primitive tiles or other tiles that would trigger the rendering of "actual" primitives (i.e. as read from the primitive lists). Thus there may, for example, in practice be a sequence of "full tile" primitive tiles triggering the "full tile" primitive processing for a sequence of different rendering tiles that are then followed by second instances of those tiles to trigger the rendering of the "actual" primitives for those tiles, and/or there may be a "full tile" primitive tile followed by one or more "actual" primitives tiles, followed by another "full tile" primitive tile, followed by one or more "actual" primitives' tiles and so on. This may also, and in an embodiment does, vary within the sequence of rendering tiles for a given render output.

For example, and in an embodiment, when first starting a given render output (e.g. frame to be displayed) there may be a sequence of two or more "full tile" primitive tiles at the start of the sequence (e.g. up to the maximum permitted number of such tiles), which are then followed by their corresponding "actual" primitives tiles, with further "full tile" primitive tiles (for other tiles of the render output) then being included in the sequence (at later "positions" in the sequence), for example, and in an embodiment, as and when one (or more) of the earlier "full tile" primitive tiles (and in particular the buffers (e.g. ZS buffers) used by those tiles) are finished with (are no longer needed)).

Correspondingly, the method of the technology described herein (and the primitive providing circuit, e.g. resource allocator) in an embodiment can, and in an embodiment does, operate to insert "full tile" primitives (tiles triggering "full tile" primitive operation) in advance of receiving tiles containing "actual" primitives for the render output from the polygon list reader.

Other arrangements would, of course, be possible.

The need to include a "full-tile" primitive in a sequence of primitives for a sequence of rendering tiles for a render output can be indicated to the primitive providing stage (circuit) in any suitable and desired manner. In an embodiment, this is achieved by a driver for the graphics processor providing appropriate command(s) and/or data to trigger the inclusion of a "full-tile" primitive in the sequence of primitives for a sequence of rendering tiles for a rendering tile as part of the commands and data that the driver provides to the graphics processor to trigger the generating of the render output in question.

For example, the driver could include in the sequence of commands provided to cause the graphics processor to generate a render output, an appropriate command or commands to trigger the inclusion of the desired "full-tile" primitive or primitives. The driver could also correspondingly provide appropriate data to be used to determine how to process the "full-tile" primitive or primitives (e.g., and in an embodiment in terms of the graphics processing operation that it is to perform).

In an embodiment, the need to issue a "full tile" primitive for tiles of a render output is indicated by means of an appropriate descriptor (e.g. a frame buffer descriptor) for the render output in question. For example, and in an embodiment, a descriptor (a frame buffer descriptor) that describes the overall processing to be performed for a render output (i.e. state, etc., for the render output as a whole) could be used to indicate that full tile primitives are to be issued for a render output (where that is desired).

The actual processing to be performed for a (and each) full tile primitive for a render output is in an embodiment also indicated by the descriptor for the render output (by the frame buffer descriptor).

As discussed above, the "full-tile" primitive or primitives will also have associated with it a condition that it is only to be processed when other primitives fall to processed for the tile to which the "full-tile" primitive relates. Again, this can in an embodiment be indicated by the driver, in any suitable and desired manner, for example as part of state information and/or other metadata, e.g. a descriptor, associated with (for) the "full-tile" primitive.

The driver in an embodiment also indicates, e.g., and in an embodiment, as part of a descriptor, the maximum number of "full tile" primitive tiles that can be preloaded safely (in flight at any one time) (as discussed above).

In an embodiment, there is a descriptor (e.g. a frame buffer descriptor) for the render output that indicates that the use of the "full tile" primitives is enabled (should be done) for the render output in question, and the type of operation that the full tile primitives are to perform (that they are "conditional"). This descriptor also in an embodiment indicates how many "full tile" primitive tiles can be preloaded safely.

This configuration data (descriptor) may, e.g., and in an embodiment, be stored by the driver appropriately in memory, with the graphics processor then reading that configuration data (descriptor) from the memory when generating the render output in question.

The primitive providing stage (circuit) (e.g., and in an embodiment, the resource allocator) in an embodiment then uses this information to determine whether to and which "full tile" primitives (and tiles) to issue for the render output in question. In an embodiment the primitive providing stage (circuit) (e.g. resource allocator) also receives information about the tiles that will be allocated for the render output before they arrive from the primitive list reader, so that it can insert the appropriate (and the appropriate number of) full tile primitives in advance of tiles containing actual primitives for the render output safely.

Other arrangements would, of course, be possible.

The driver may correspondingly recognise the need to trigger the issuing of a "full-tile" primitive or primitives by the graphics processor when generating a render output in any suitable and desired manner. For example, this may be in response to an explicit API function call from the application that requires the graphics processing, and/or the driver may be able to determine from the graphics processing that is requested by an application, that the use of a "full-tile" primitive or primitives when generating a render output would be desirable (and correspondingly then issue appropriate commands and/or data to the graphics processor to trigger the use of a "full-tile" primitive or primitives when generating the render output).

Other arrangements would, of course, be possible.

As discussed above, primitives provided (issued) by the primitive providing stage (including any full tile primitives) are provided (issued) to subsequent processing stages of the graphics processing pipeline that the graphics processor executes.

The one or more (subsequent) processing stages of the graphics processing pipeline can be any suitable and desired graphics processing stages (circuits) that can process primitives provided for processing by the primitive providing stage (circuit) (e.g. primitive list reader).

In an embodiment, the one or more subsequent processing stages comprise at least a rasteriser, and a renderer (in an embodiment comprising one or more fragment processing stages (circuits)).

In this case, the rasteriser in an embodiment receives primitives from the primitive providing stage (circuit) (e.g. primitive list reader), rasterises those primitives to fragments, and provides the fragments to the renderer (to the (first one of the) one or more fragment processing stages (circuits)) for processing. The renderer (the one or more fragment processing stages (circuits)) in an embodiment receives fragments from the rasteriser, and is operable to perform one or more fragment processing (e.g. rendering) steps (operations) on those fragments to generate rendered fragment data, which rendered fragment data may, e.g., be written to a tile buffer.

The rasteriser can rasterise primitives provided by the primitive providing stage (circuit) (e.g. primitive list reader) to fragments in any suitable and desired manner. Each fragment generated by the rasteriser may represent (have associated with it) a single sampling point, or plural sampling points, as desired. In an embodiment, each fragment represents a set of plural, in an embodiment four (2×2), sampling points.

In an embodiment, the rasteriser is configured to perform "hierarchical rasterisation". Thus, the rasteriser is in an embodiment operable to test primitives to be rasterised against progressively smaller patches (regions) of the render output area, e.g. and in an embodiment, in an iterative manner. Other arrangements for the rasteriser would be possible. For example, in other embodiments, the rasteriser rasterises primitives to fragments in a non-hierarchical manner.

In an embodiment, there are one or more further subsequent processing stages between the primitive providing stage (circuit) and the rasteriser. These stages in an embodiment comprise one or more of, and in an embodiment plural of, and in an embodiment all of: a vertex loading stage (circuit) (vertex loader); a triangle setup stage (circuit); and a rasteriser (e.g. reorder) buffer (that is operable to, and configured to, buffer, and in an embodiment also reorder primitives for providing to the rasteriser).

In general, the subsequent processing stages up to and including the rasteriser can be viewed as being "per-primitive" processing stages, in that they operate on primitives (at a primitive level), rather than on individual fragments. The fragment processing stages (the renderer) after the rasteriser will then be "per-fragment" processing stages.

The rasteriser is, as discussed above, in an embodiment followed by a rendering pipeline, in an embodiment comprising one or more, and in an embodiment a plurality of, fragment processing stages (circuits).

The one or more fragment processing stages (circuits) following the rasteriser can be any suitable and desired graphics processing pipeline stages that can perform fragment processing (e.g. rendering) steps (operations) in respect of fragments generated by the rasteriser.

The one or more fragment processing stages that follow the rasteriser may comprise, for example, one or more of, and in an embodiment plural of, and in an embodiment all of: a fragment buffer that is operable to issue fragments to a next stage of the graphics processing pipeline; an early depth and/or stencil testing stage (circuit) that is operable to perform a depth and/or stencil test; a renderer (rendering circuit) that is operable to render fragments to generate rendered fragment data (the fragment rendering may comprise, for example, texture mapping, blending, fragment shading, ray-tracing, etc.); a late depth and/or stencil testing stage (circuit) that is operable to perform a depth and/or stencil test; one or more tile buffers; and a write out stage (circuit) operable to write data from the tile buffers (etc.) to other storage, such as a (main) memory.

Once a "full tile" primitive has been issued by the primitive providing circuit (stage), then that primitive will be processed by a subsequent processing stage of the graphics processing pipeline, without waiting for any determination of whether any other primitives will be processed for the tile in question.

The "full-tile" primitive is in an embodiment processed in the same way as any other primitive for the graphics processor and graphics processing pipeline in question.

Thus, in an embodiment, the "full-tile" primitive is first subjected to a triangle (primitive) set up operation (in an embodiment in a triangle set up unit), e.g. to generate barycentric functions for varying interpolation, and/or a set of edge functions for the primitive.

The "full-tile" primitive is in an embodiment then rasterised to graphics fragments, and those graphics fragments then processed accordingly (rendered) to perform the desired graphics processing operation. In an embodiment, the full-tile primitive has associated with it, and triggers, a fragment shading operation (a fragment shader) that performs the desired graphics processing operation.

It will be appreciated in this regard that while the at least one subsequent processing stage of the graphics processing pipeline will start to process a full tile primitive without waiting for any determination of when the other primitives will be processed for the tile in question, it does not have to be the case that all subsequent processing stages process the full tile primitive in this regard (and, indeed, it is an aim of the technology described herein to try to avoid subsequent processing stages processing a full tile primitive when that can be done, even though the processing of the full tile primitive is always started).

Thus there will be at least one subsequent processing stage of the graphics processing pipeline that starts processing the full tile primitive, but there may, for example, only be one subsequent processing stage that does that if the processing for that primitive can be determined to be stopped early enough. In an embodiment, the full tile primitive is at least begun to be processed (without waiting for any determination of whether any other primitives will be processed for the tile to which it relates) by the rasteriser (and any intervening stages between the primitive providing stage (circuit) and the rasteriser).

It will be appreciated that at least aspects of the processing of a full time primitive will require and use a set of vertices for the full tile primitive. The vertices for the full tile primitive could be explicitly indicated to the relevant processing stages, for example by the driver for the graphics processor deriving and providing data, such as positions, for those vertices, or the graphics processor could determine the vertices for a full tile primitive indirectly, for example, based on an assumption that the full tile primitive will occupy the entirety of the tile, e.g. by assuming the vertices are at the corners of the tile and/or of the overall render output.

Other arrangements would, of course, be possible.

As discussed above, although the processing of a full tile primitive is begun in the technology described herein without waiting for any determination of whether any other primitives will be processed for the tile that the full tile primitive relates to, when it is subsequently determined that no other primitives will be processed for the tile in question, then the processing of the full tile primitive is (attempted to be) stopped.

It can be determined that no other primitives will be processed for the tile to which a full tile primitive relates (after the processing of the full tile primitive has been started) in any suitable and desired manner.

For example, it could be determined whether any other primitives for the tile reach the rasteriser and/or the rasteriser (reorder) buffer, and if the end of the tile in question is seen without any other primitives reaching the rasteriser and/or the rasteriser buffer, it can then correspondingly be determined that no other primitives will be processed for the tile to which the full tile primitive relates. (It should be noted here that the technology described herein only stops the processing of a full tile primitive in the event that no other primitives at all will be processed for the tile to which the full tile primitive relates. If at least one other primitive reaches the rasteriser and/or reorder buffer, then the full tile primitive will be processed completely and in the appropriate manner.)

The Applicants have recognised in this regard that it could be the case that other primitives for a tile may not in practice reach the rasteriser and/or the rasteriser buffer, because although issued by the primitive providing circuit, they may, for example, be subsequently culled before they reach the rasteriser and/or the rasteriser buffer, for example because it can be determined that they fall outside the tile and/or the view frustum in question. Thus it can be the case that although "actual" primitives are issued for potentially rendering for a tile (e.g. from respective primitive lists that include the tile), in fact none of those primitives actually fall to be rendered for the tile (and that can be recognised sufficiently early in the pipeline).

In an embodiment, the fact that no other primitives will be processed for the tile to which a full tile primitive relates is determined in response to seeing that no (other) primitives will fall to be issued for the tile. This event is in an embodiment determined by the primitive providing stage (circuit), i.e. by that stage (circuit) determining that there are no primitives to be issued for the tile in question (i.e. that it has not and will not be issuing any primitives for the tile in question). The primitive providing circuit (stage) may determine this in any appropriate and desired manner, for example by recognising when the end of the tile has been reached (and that no primitives have been issued since the start of the tile).

In one embodiment, an "empty" rendering tile (that is, the lack of any primitives (other than the full tile primitive) to be processed for the rendering tile) is determined (recognised) when there are no primitives (to be rasterised and rendered) listed in the primitive list(s) for the rendering tile.

Thus, in an embodiment, the primitive providing circuit (stage) determines that no other primitives will be processed for a tile to which a full tile primitive relates in response to there being no primitives in the primitive lists (and/or no primitive lists to read) for the tile in question (i.e. that there are no primitives to be processed in the list(s) of primitives read by the primitive list reader for the tile).

In an embodiment, this situation is recognised by the resource allocator recognising that it has received only a start of tile and end of tile marker for the tile in question from the primitive list reader. In other words, if the list of commands for a tile output by the primitive list reader contains only a start of tile and end of tile marker (i.e. no actual primitives), the tile is considered empty (i.e. to not contain any actual primitives for rendering). In this case, it is in an embodiment then checked, e.g. and in an embodiment by the resource allocator, whether a "full tile" primitive has already been issued for the tile in question, and if so, the appropriate operation to stop any further processing of the full tile primitive (where possible) is then triggered.

Other arrangements for determining that there are no primitives to be processed for a tile for which a "full tile" primitive has already been issued for processing would, of course, be possible.

Thus, in an embodiment, the method of the technology described herein comprises (and the graphics processor is configured to), determining whether any other primitives will be processed for a tile to which an (earlier) primitive that performs a processing operation for the entirety of a tile relates, and when it is determined that no other primitives will be processed for the tile to which the primitive that performs a processing operation for the entirety of the tile relates, causing at least one of the one or more subsequent processing stages of the graphics processing pipeline to stop performing processing in respect of the primitive that performs a processing operation for the entirety of the tile (and when it is not (when it is other than) determined that no other primitives will be processed for the tile to which the primitive that performs a processing operation for the entirety of the tile relates, not causing (other than causing) processing in respect of the primitive that performs a processing operation for the entirety of the tile to be stopped (i.e. permitting processing in respect of the primitive that performs a processing operation for the entirety of the tile to continue (and, in an embodiment, to be completed in the appropriate fashion)).

In an embodiment, the primitive providing stage (circuit) performs the determination of whether any (that no other) primitives will be processed for the tile to which a full tile primitive relates (and correspondingly causes at least one of the one or more subsequent processing stages of the graphics processing pipeline to (attempt to) stop performing processing in respect of the full tile primitive for that tile, as appropriate).

When it is determined that no other primitives will be processed for a tile, at least one subsequent processing stage is caused to stop processing the full tile primitive in question. This can be done in any suitable and desired manner, and using any suitable and desired mechanism.

In an embodiment, an appropriate indication is provided to the subsequent processing stage to indicate that processing of the full-tile primitive should be stopped.

The indication to the subsequent processing stage to stop processing of a full tile primitive is in an embodiment sent by the processing stage (circuit)/element where the determination that there are no other primitives to be processed for the tile in question is made (is recognised). Thus, for example, where the primitive providing circuit (stage) (e.g. a resource allocator of that stage (circuit)) performs the determination that there are no primitives to be processed for a tile to which a full tile primitive relates, the primitive providing stage (circuit) (e.g. a resource allocator) will correspondingly provide the appropriate indication to a subsequent processing stage or stages of the graphics processing to indicate that processing of the corresponding full tile primitive should be stopped.

Correspondingly, in the case where some later processing stage, such as a triangle setup stage (circuit) determines that there will be no primitives to be processed for a tile, that stage (circuit) will correspondingly provide the "stop processing" indication to a subsequent processing stage or stages of the graphics processing pipeline.

Thus, in an embodiment, the processing stage that determines that there will be no "actual" primitives for a tile to which a full-tile primitive relates is operable to and configured to cause a subsequent processing stage to stop processing a full-tile primitive by providing an indication to the subsequent processing stage that indicates that processing in respect of the full-tile primitive should be stopped, with the subsequent processing stage then being operable to and configured to stop performing processing in respect of a full-tile primitive in response to receiving such an indication that indicates that processing in respect of a full tile primitive need not be performed (can be stopped).

The indication that is sent to a subsequent processing stage to cause it to stop any processing of a full tile primitive can take any suitable and desired form. It may, for example, include an appropriate indication of the full tile primitive to which it relates (e.g. in the form of an identifier that allows the primitive to be killed to be identified (determined)), and/or an indication to "kill" that full tile primitive.

In an embodiment, the indication of the full tile primitive that is to be "killed" is provided by identifying the tile (e.g. using the tile index) to which the "kill" indication relates (as that will then allow the corresponding full tile primitive, if any, for the identified tile to be determined).

In an embodiment, the indication comprises the setting of a bit to indicate for the tile in question that any "full tile" primitive for that tile should be "killed", e.g., and in an embodiment, in a signal that has a respective set of bits representing each tile of the render output in question, to indicate that any "full tile" primitive for the tile in question "should be killed". Thus, in an embodiment, the resource allocator, for example, will set a bit for the tile index of the tile (and of each tile) for which any "full tile" primitive is to be killed in a broadcast "full tile primitive kill" vector (a vector with one bit per tile) that is then broadcast to a subsequent stage or stages of the graphics processing pipeline.

A subsequent processing stage that receives the full tile primitive "kill" indication can correspondingly be operable to and configured to recognise that indication and stop processing of the corresponding full tile primitive in any suitable and desired manner. For example, depending upon what the processing that the subsequent processing stage performs (e.g. whether it performs processing for whole primitives or for fragments), it may be operable to identify the primitive in question in, e.g., in a sequence of primitives to be processed, and to, e.g., mark the primitive as no longer to be processed.

In an embodiment, the subsequent processing stage (that is to respond to the full tile primitive "kill" indication) is operable to use the indication of the tile to which the "kill" indication relates (e.g. the tile index) and a corresponding specified primitive type (i.e. indicating a conditional "full tile" primitive) to determine whether any primitive that it is processing should be "killed". Other primitive types, or primitives from other tiles that are not indicated as to be killed, would not then be killed.

Thus in the embodiment where a "full tile primitive kill" vector as discussed above is used, the appropriate subsequent processing stage will use that vector to check if it has any primitives of the specific primitive type (i.e. "full tile primitives") for any "killed" tiles, and if so kill those primitives, but not kill other primitive types for any "killed" tile or primitives from other tiles that are not indicated as being "killed".

Thus, in an embodiment, the stopping of the processing of a full tile primitive is determined based on a primitive type (i.e. the determination that it is a full tile primitive of the appropriate type to be killed) and whether or not the primitive relates to a tile that is indicated as to be "killed".

Other arrangements would, of course, be possible.

Thus, in an embodiment, a subsequent processing stage or stages (e.g. the rasteriser) can and does keep track of the types of primitives that they are processing and the tiles to which the primitives they are processing relate, and will check both the primitive type and tile for any primitives that it is currently processing, to determine whether and which "full tile" primitives, if any, it is currently processing should be "killed".

In an embodiment when a subsequent processing stage is to process a "full tile" primitive, the broadcast indication of any "full tile" primitives to be killed is checked, to determine whether the full tile primitive should in fact be processed or not.

The full tile primitive "kill" indication can be provided to a subsequent processing stage in any suitable and desired manner.

In one embodiment this is done by sending (broadcasting) an appropriate signal to the subsequent processing stage or stages to indicate that processing of the full tile primitive should be stopped. Thus in this case, the, e.g. primitive issuing stage (circuit) will broadcast a signal to one or more subsequent processing stages to indicate that processing of a full tile primitive should be stopped.

In another embodiment, the indication that processing of a "full tile" primitive should be stopped is provided by setting (e.g. updating) metadata that the subsequent processing stage queries when (and prior to) processing a primitive.

In this case, one or more of the subsequent processing stages are correspondingly in an embodiment operable to, and configured to, prior to performing subsequent processing steps (e.g. operations) in respect of a (full-tile) primitive, determine whether metadata stored for the primitive indicates that processing for the primitive need not be performed, and to, when it is determined that metadata stored for the primitive indicates that processing of the primitive need not be performed, stop processing of (not process) the primitive.

The indication to stop performing processing in respect of a full tile primitive could be sent to only a single subsequent processing stage or to plural subsequent processing stages of the graphics processing pipeline, as desired. In an embodiment, it is sent at least to the rasteriser (rasterising stage) (and in one embodiment, only to the rasteriser).

In an embodiment, the indication to cause a subsequent processing stage to stop performing processing in respect of a full tile primitive is sent to the rasteriser and to one or more further processing stages between the primitive providing stage (circuit) and the rasteriser. In this case, the indication is in an embodiment sent to one or more of, and in an embodiment plural of, and in an embodiment all of: a vertex loader, a triangle setup stage (circuit) and a reorder buffer (rasteriser buffer) of the graphics processing pipeline. In an embodiment it is sent to the triangle setup stage (circuit) and the rasteriser. Other arrangements would, of course, be possible.

It would also be possible, if desired, to send an indication to stop processing a full tile primitive to processing stages that are after the rasteriser, such as, for example, to one or more fragment processing stages. However, in an embodiment, the indication is not sent beyond the rasteriser. The Applicants have recognised in this regard, that sending the indication to stop processing a full tile primitive to the rasteriser at least will, in typical operation, act to reduce redundant processing of a full tile primitive in most cases, such that any sending of that indication beyond the rasteriser would be unlikely to have any significant further benefit.

In response to an indication to stop processing of a full tile primitive, the processing stage in question should (attempt to) stop processing of the full tile primitive to which the indication relates. The subsequent processing stage will accordingly attempt to stop any remaining processing that it is to perform in respect of the full tile primitive. This may comprise, for example, not starting any further processing in respect of the full tile primitive (where there is still some processing for that primitive to be performed), but completing any processing for the full tile primitive that is already in progress, and/or also stopping any processing for the full tile primitive that is already in progress as well.

In an embodiment the full tile primitive is discarded (culled) from further processing, i.e. "killed" in response to the indication to stop processing that primitive. This may be done in any appropriate and suitable manner, for example in the normal manner for discarding (e.g. culling) primitives from further processing in the graphics processor and graphics processing pipeline in question.

Correspondingly, in an embodiment, a subsequent processing stage that receives an indication to stop processing for a full tile primitive operates to, and is configured to, not send the full tile primitive whose processing is to be stopped to any further stages (e.g. a next stage) of the graphics processing pipeline. Thus, for example, and in an embodiment, the rasteriser, in response to an indication to stop processing for a full tile primitive, will operate to stop issuing fragments for the primitive (to not send any further fragments for the primitive to the fragment processing pipeline for processing).

It will be appreciated that a subsequent processing stage may receive an indication to stop processing for a full tile primitive only after it has completed its processing of the full tile primitive. Thus the operation in the manner of the technology described herein will cause a subsequent processing stage to (attempt to) stop any remaining processing that it has for a full tile primitive.

(Correspondingly, any subsequent processing stages that are processing the full tile primitive or that receive the full tile primitive for processing to which an indication to stop processing the full tile primitive is not sent will simply continue to perform any remaining processing of the full tile primitive that falls to be done.)

In an embodiment, even in the case where it is determined that no "actual" primitives will be processed for a tile, and that the processing of a full tile primitive for the tile should be stopped, an "end of tile" marker (indication), that indicates to the subsequent processing stages that the tile has "ended" (that there will be no more processing for the tile) is in an embodiment still passed through the graphics processing pipeline for the tile in question (e.g. in the normal manner) (i.e. is sent through the pipeline even though the full tile primitive is to be culled or discarded and there are no other primitives to process for the tile).

The Applicants have recognised that this will then help to "clean up" any processing for a full tile primitive that is subsequently discarded, for example in the case where the full tile primitive has been partially passed on to subsequent stages of the graphics processing pipeline (e.g. beyond the rasteriser) before it was determined that processing of the full tile primitive was not necessary. By still passing an end of tile marker for the tile in question through the pipeline, any subsequent processing stages can correctly complete their processing of the full tile primitive should that be necessary. Thus, in an embodiment, the subsequent processing stages that use the indication that processing for a full tile primitive may be stopped, are configured to, and operate to, in any event, not cull any end of tile indication (marker) associated with the tile in question, and to still pass that end of tile indication to a next processing stage.

In an embodiment, an appropriate end of tile marker is sent onwards through the pipeline for the tile in question when it is subsequently determined that no other primitives will be processed for the tile to which the primitive that performs a processing operation for the entirety of the tile relates. Thus, in an embodiment, a determination that no other primitives will be processed for a tile to which a primitive that performs a processing operation for the entirety of the tile relates also triggers the inclusion of an appropriate end of tile marker (indication) for the tile in question in the sequence of tiles and primitives that is sent to the subsequent processing stages of the graphics processing pipeline.

Thus, in an embodiment, as well as causing at least one of the one or more subsequent processing stages of the graphics processing pipeline to stop performing processing in respect of the primitive that performs a processing operation for the entirety of a tile when it is determined that no other primitives will be processed for the tile to which the primitive that performs a processing operation for the entirety of the tile relates, an end of tile indication (marker) is also inserted in the sequence of tiles and primitives for the tile in question, so as to trigger any desired "clean-up" processing in respect of the tile in question (and in particular relating to the earlier full tile primitive for that tile).

Thus, in an embodiment, when the primitive providing stage (circuit) (and in particular the resource allocator) determines that a tile is "empty" (does not contain any actual primitives to be rendered) (as discussed above), as well as providing the "full tile primitive" "kill" indication, the primitive providing stage (circuit) (e.g., and in an embodiment, the resource allocator) also inserts a "clean-up" end of tile indication (marker) for the tile in question in the sequence of tiles and primitives that is sent onwards to the subsequent processing stages of the graphics processing pipeline, which end of tile indication is then passed through the graphics processing pipeline appropriately, to indicate to the stages of the graphics processing pipeline that there is no further processing for the tile in question (that the tile in question has finished).

It is preferred solely to insert an end of tile indication for this purpose (i.e. there is no need to insert a start of tile marker as well (and in an embodiment that is not done)).

Other arrangements would, of course, be possible.

Subject to the particular operation in the manner of the technology described herein in relation to full tile primitives, the graphics processor and graphics processing pipeline can otherwise operate in any suitable and desired manner, for example, and in an embodiment, in the normal manner for the graphics processor and graphics processing pipeline in question. Thus the graphics processor will otherwise render each rendering tile in the sequence of rendering tiles for a given render output, and output the respective rendering tiles (e.g. to a frame buffer in memory) for subsequent use (e.g. for display).

In an embodiment, each rendering tile is processed and rendered separately, i.e. the separate, individual tiles are rendered one by one (i.e. on at tile-by-tile basis). This rendering can be carried out in any desired manner, for example, by rendering the individual tiles in succession or in a parallel fashion, and storing the output for each tile, e.g., in the frame buffer (in (the) memory), e.g. for display.

Correspondingly, any (normal) primitives to be rendered for a rendering tile can be, and are in an embodiment, rendered in the normal manner for the graphics processor and graphics processing pipeline in question (but any full tile primitive to process for a tile of a given render output will be handled in the manner of the technology described herein).

As well as the particular elements, stages, circuits, etc., described above with particular reference to the operation in the manner of the technology described herein, the graphics processor and graphics processing pipeline may otherwise include any suitable and desired elements, circuits, processing stages, etc., that a graphics processor and graphics processing pipeline may normally comprise.

Thus, for example, the graphics processor should, and in an embodiment does, include one or more tile buffers that store rendered data for a rendering tile being rendered, until the rendering of the rendering tile has been completed.

Correspondingly, the graphics processor in an embodiment includes a write out circuit coupled to the tile buffer for writing completed rendering tiles to other storage, such as a frame buffer in external memory, for use.

It will furthermore be appreciated that, the graphics processor of the technology described herein may be part of an overall graphics processing system that includes, e.g., and in an embodiment, a host processor (e.g. CPU) that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor. The host processor may also execute a compiler or compilers for compiling programs to be executed by (e.g., a programmable processing stage (shader) of the) graphics processor.

The graphics processor may also comprise, and/or be in communication with, one or more memories and/or memory devices that store the data described herein, and/or the output data generated by the graphics processor, and/or store software (e.g. programs) for performing the processes described herein. The graphics processor may also be in communication with a host microprocessor, and/or with a display for displaying images based on the data generated by the graphics processor.

The technology described herein can be used for all forms of output that a graphics processor may be used to generate. For example, the graphics processor may generate frames for display, render to texture outputs, etc. The output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably operable microprocessor based system. In some embodiments, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

The embodiment of the technology described herein relates to performing a graphics processing operation for the entire area of a render output (in an embodiment a frame for display) being generated by a graphics processor of a graphics processing system.

Such a system may be configured as shown in FIG. 1 (and described above). FIG. 1 shows a typical computer graphics processing system, comprising a host processor (CPU) 1, a graphics processing unit (GPU) 3, and a memory 5 for storing data required by and/or generated by the host processor (CPU) 1 and graphics processing unit (GPU) 3.

The memory 5 may be "on-chip" with the GPU 3 and/or CPU 1, or may be an external memory that can be accessed by the GPU 3 and/or CPU 1.

When an application 2 that is executing on the CPU 1 requires graphics processing from the GPU 3, such as a frame to be displayed, the application 2 may send appropriate commands and data to a driver 4 for the GPU 3 that is running on the CPU 1.

The driver 4 may then send appropriate commands and data to the GPU 3 to cause it to generate the graphics output required by the application 2. The commands and data provided by the driver 4 typically include commands to "draw" primitives to be rendered for the render output (frame) to be generated by the GPU 3, together with associated vertex data representing the vertices to be used for the primitives for the render output (frame).

The driver 4 may send commands and data to the GPU 3 by writing to data structures 6 in the memory 5, which data structures 6 may then be read by the GPU 3. Typically, the CPU 1 also writes vertex data defining the vertices for primitives to be drawn to the memory 5.

The commands sent to the GPU 3 will then typically cause the GPU 3 to read and process the vertex data stored in the memory 5 to generate the render output (frame). The GPU 3 will typically use the vertex data for a primitive to rasterise the primitive so as to determine a region of the render output (frame) to which the primitive applies, and to then render the primitive for that region.

Once all of the primitives to be rendered for the render output (frame) have been rendered, the completed render output (frame) may be written to a frame buffer 7 in the memory 5, from where it may be provided for display on a display device, such as a screen or printer.

Figure 4:
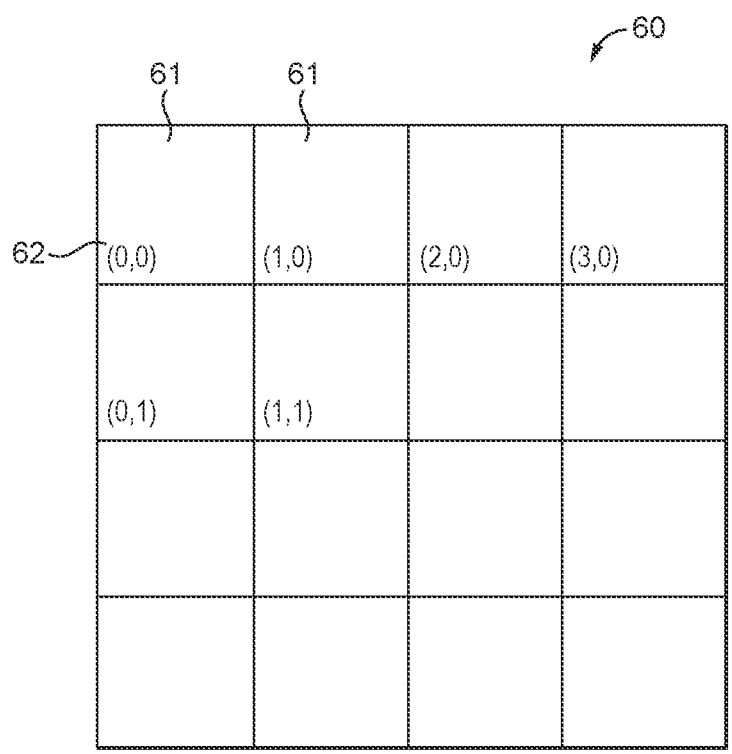
FIG. 4 illustrates tile-based rendering.

In the present embodiments, the graphics processing system uses so-called "tile-based" rendering. In other words, as illustrated in FIG. 4, the render output, e.g. frame, 60 being generated is subdivided into, and as processed as, respective tiles 61, that together make up the overall render output 60. (As shown in FIG. 4, each tile 61 in a given render output will have a respective tile index 62, that identifies the tile in the output (e.g. its position in the render output).)

Figure 2:
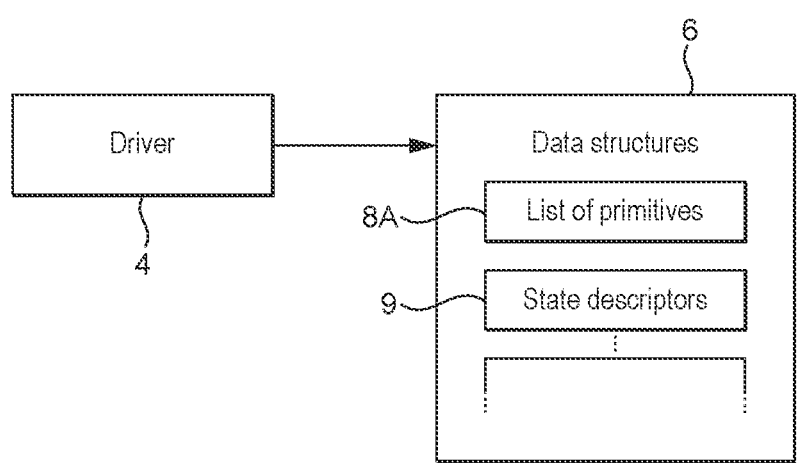
FIG. 2 illustrates a driver and memory data structures in an embodiment of the technology described herein.

FIG. 2 shows the operation of the driver 4 for a tile-based graphics processing system in the present embodiments in more detail. As shown in FIG. 2, the driver 4, in response to the commands and data received from the application 2, may write to the data structures 6 in the memory 5. The data structures 6, at this stage, may include commands 8A to be processed for the frame, together with a list of state descriptors 9.

The state descriptors 9 may include data for configuring the GPU 3 to process the commands, such as data in the form of any one or more of: a "Draw Call Descriptor" ("DCD"), a "Frame Buffer Descriptor" ("FBD"), a "Renderer Target Descriptor" ("RTD"), a "Blend Descriptor", "Scissor Box Descriptor", a "Shader Program Descriptor", a "Texture Descriptor", and other descriptors that describe the renderer state. Typically, each command in the list of primitives 8A includes one or more indices indicating the data for the state descriptors 9 to use to process the command in question. The memory 6 can also store vertex data defining the vertices of primitives to be rendered.

As discussed above, in tile-based rendering, the two-dimensional render output (frame) is rendered as a plurality of smaller area sub-regions, usually referred to as "tiles". The tiles are each rendered separately (typically one-after-another). The rendered tiles are then recombined to provide the complete render output (e.g. frame for display). In such arrangements, the render output is typically divided (by area) into regularly-sized and shaped rendering tiles (they are usually e.g., squares or rectangles).

The advantage of such tile-based rendering is that graphics processing commands (primitives) that do not apply to a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those commands (primitives) that actually apply to a given rendering tile so as to, e.g., avoid unnecessarily processing commands and primitives that do not actually apply to a tile.

In order to facilitate this, in the present embodiments, the GPU 3 prepares for each rendering tile a list of the primitives to be processed for that rendering tile (e.g. that will apply to the tile), by arranging the primitives (commands for drawing the primitives) in the list of primitives 8A produced by the driver 4 into respective "primitive lists" (which can also be referred to as a "tile list" or "polygon list") that identify (e.g. by reference to a primitive indicator) the primitives to be processed for the tile in question.

In one embodiment, the GPU 3 prepares primitive lists for only single rendering tiles (one for each single rendering tile). In another embodiment, however, the GPU 3 prepares primitive lists both for single rendering tiles, and primitive lists for output frame areas comprising more than one tile (i.e. primitive lists that encompass more than one rendering tile (and thereby, in effect, a larger area) of the frame to be generated). In other words, as well as preparing lists of primitives that are exclusive to single rendering tiles only, primitive lists that can and will be used for plural rendering tiles in common can be and are prepared.

When a command to draw a primitive is received for processing by the GPU 3, the primitive is put in the appropriate primitive list(s) (stored in the data structures 6 in the memory 5). This is typically done by reading and processing vertex data for the primitive (from the memory 5) to determine a location for the primitive, comparing the primitive's location with the locations of the frame areas for which primitive lists are being prepared, and then allocating the primitive to the primitive list(s) based on the comparison. This may be done using a bounding box binning technique or an exact binning technique, for example.

Once lists of primitives to be processed (the primitive lists) have been prepared for each single rendering tile (and for frame areas comprising more than one tile, as the case may be), the primitive lists may be stored for use in the data structures 6 in the memory 5, e.g., to allow the GPU 3 to identify which primitives need to be considered (and processed) when the tile in question is rendered.

Then, when a tile is being rendered, the GPU 3 will read the primitive list(s) for the tile in question, and process each primitive listed in the list(s) in turn to generate an output frame area for the tile. The GPU 3 will typically process each command to draw a primitive by rasterising the primitive to fragments and then processing (rendering) the fragments.

Each tile may be rendered in turn in this manner, and the output frame areas for all of the tiles combined to generate the entire output frame, which may be stored in the frame buffer 7 in the memory 5, e.g. for display.

Figure 3:
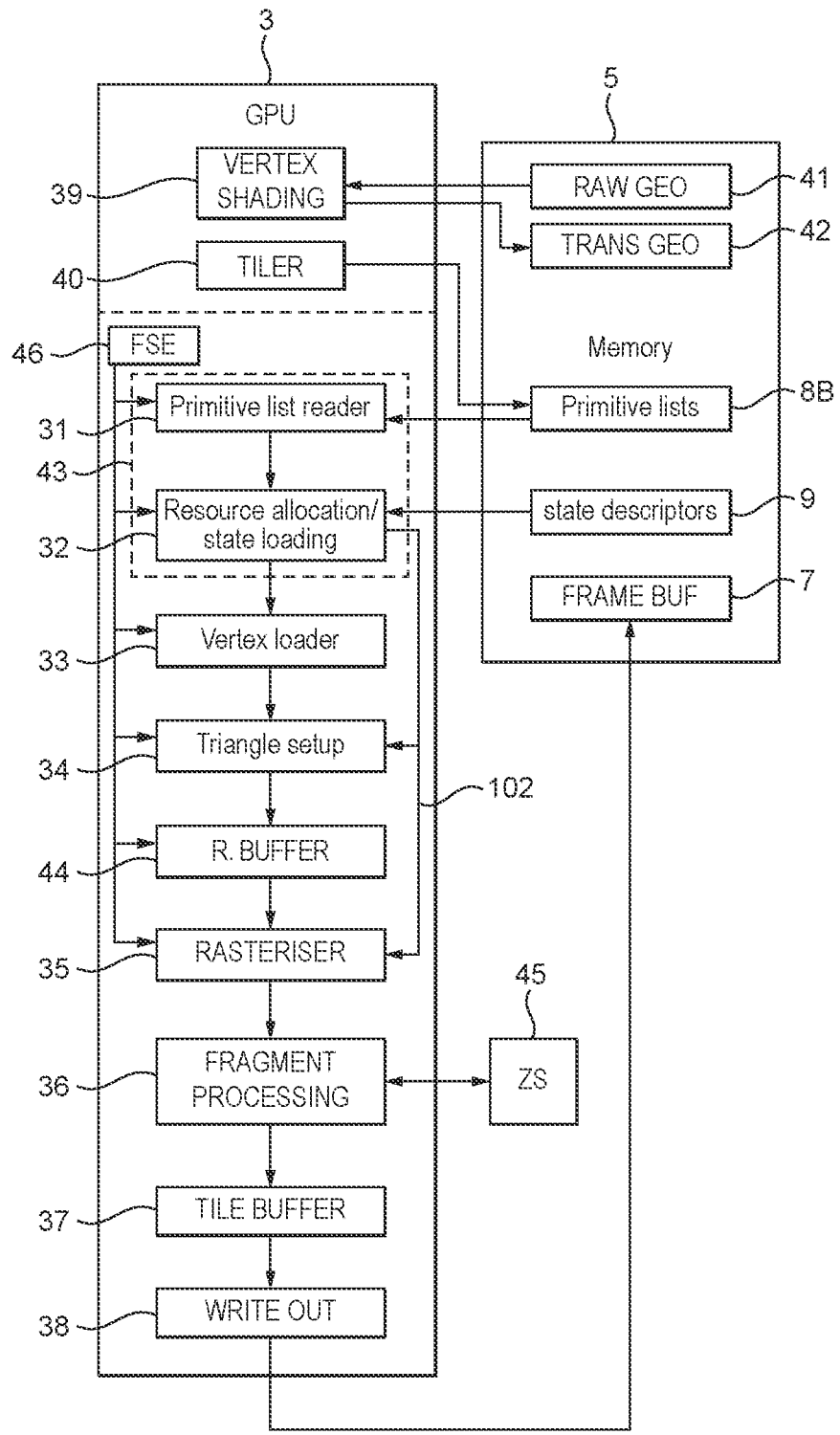
FIG. 3 shows an exemplary graphics processor and graphics processing pipeline which may be operated in accordance with an embodiment of the technology described herein.

FIG. 3 shows schematically the graphics processor 3 of the present embodiments in more detail.

The graphics processor 3 shown in FIG. 3 is a tile-based graphics processor that executes a tile-based graphics processing pipeline, and thus will produce rendering tiles for a render output data array, such as an output frame, to be generated.

The render output may typically be an output frame intended for display on a display device, such as a screen or printer, but may also, for example, comprise intermediate data intended for use in later rendering passes (also known as a "render-to-texture" output), etc.

FIG. 3 shows the main elements and pipeline stages of the tile-based graphics processing pipeline executed by the graphics processor 3. As will be appreciated by those in the art there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc. of the graphics processing pipeline as shown in FIG. 3 may be implemented as desired and will accordingly comprise, e.g. appropriate circuits and/or processing logic, etc., for performing the necessary operation and functions.

As shown in FIG. 3, the graphics processor 3 can access a memory 5, such as a main memory of the overall data processing system that the graphics processor 3 is part of.

The memory 5 stores, inter alia, and as shown in FIG. 3, a set of raw geometry data 41 (which is, as discussed above, provided by the graphics processor driver 4 or an API running on the host system (microprocessor) 1), a set of transformed geometry data 42 (which is a result of various transformation and processing operations carried out on the raw geometry 41), and a set of primitive lists 8B. As discussed above, the primitive lists contain data and commands, etc. for the respective primitives to be rendered. The transformed geometry data 42 comprises, for example, transformed vertices (vertex data) etc.

The memory also stores, as discussed above, sets of state information, in the form of descriptors 9, that provide state and configuration information for use when rendering a given render output, and a frame buffer 7 that stores a render output being generated.

As shown in FIG. 3, the graphics processor includes, inter alia, a programmable vertex shader 39, and a tiler 40. The vertex shader 39 takes as its input the raw geometry data 41 stored in the memory 5, and processes that data to provide transformed geometry data 42 (which it then stores in the memory 5), comprising the geometry data in a form that is ready for 2D placement in the render output (e.g. frame to be displayed).

The tiler 40 then performs the process of "tiling" to allocate primitives to the primitive lists which are then used to identify the primitives that should be rendered for each rendering tile that is to be rendered to generate the render output (e.g. frame for display). To do this, the tiler 40 takes as its input the transformed and processed vertex (geometry) data 42 from the vertex shader 39 (i.e. the positions of the primitives in the frame), builds primitive lists using that data, and then stores those lists as the primitive lists 8B in the memory 5. The tiler 40 may use, for example, exact or bounding box binning for this process.

Once all the primitive lists for a given render output have been prepared by the tiler 40, then that render output can be processed (rendered).

As shown in FIG. 3, in the present embodiments, the GPU 3 includes a primitive list reader (circuit) 31, a resource allocation/state loading unit (circuit) 32, a vertex loader (circuit) 33, a triangle setup unit (circuit) 34, a rasteriser (circuit) 35, and a fragment processing unit (circuit) 36 for this purpose.

The processing of the render output once the primitive lists for the render output have been prepared is performed under the control of a "fragment shader endpoint" (controller) 46 that receives fragment processing tasks to be performed (essentially respective tiles with pointers to descriptors defining the processing to be performed). The fragment shader endpoint 46 splits the tasks into individual tiles and allocates a tile index for each tile. After allocation, the tiles are sent to the primitive list reader 31 for list reading.

Thus the render output (frame buffer) is split into tasks and the tasks are sent to the fragment shader endpoint 46. The fragment shader endpoint 46 then loads the frame buffer descriptor and allocates a tile index (or indices) for a task.

The primitive list reader 31 determines which primitives are to be processed for each tile to be rendered and provides those primitives (on a tile-by-tile basis) to the resource allocator 32. It does this by considering the primitive lists 8B stored in the memory 5, and selecting from those lists the primitives to be processed for a tile. The primitive list reader 31 reads the stored primitive lists 8B that have been determined as applying to the tile in question and provides a sequence of primitives to be processed for the tile (as determined from the primitive lists 8B) to the resource allocator 32.

This is done for each tile to be rendered for the render output in question, such that the primitive list reader 31 will send sequences of primitives for a sequence of rendering tiles to the resource allocator 32. Each new tile in the sequence is denoted by an appropriate marker or markers that is included in the sequence by the primitive list reader 31, such as a start of tile marker before the beginning of the tile and an end of tile marker at the end of a tile. Other arrangements, such as using only a single, common marker to denote the boundary between tiles would also be possible, if desired.

The resource allocator 32 operates to configure the various elements of the graphics processor 3 and graphics processing pipeline for rendering the primitives from the primitive list reader 31. For example, the resource allocator 32 appropriately configures the fragment processing stages 36 for rendering the primitives.

As shown in FIG. 3, in order to be able to do this, as well as receiving the sequences of tiles and primitives for the tiles from the primitive list reader 31, the resource allocator 32 is also able to read the appropriate state descriptors (containing the appropriate state and configuration information) from the memory 9. The descriptors read by the resource allocator 32 may be for and relate to the render output (e.g. frame) as a whole, be for a particular draw call for the render output, etc.

The resource allocator 32 uses the configuration data stored in the descriptors 9 to configure the subsequent stages of the graphics processing pipeline executed by the graphics processor 3 for processing the tile, etc., in question.

The resource allocator 32 then provides the sequence of tiles (and the sequences of primitives for the tiles) to the subsequent stages of the graphics processing pipeline.

Thus the primitive list reader 31 and resource allocator 32 together form a primitive providing stage (circuit) that provides sequences of rendering tiles and primitives for those rendering tiles to subsequent stages of the graphics processing pipeline for processing.

Figure 5:
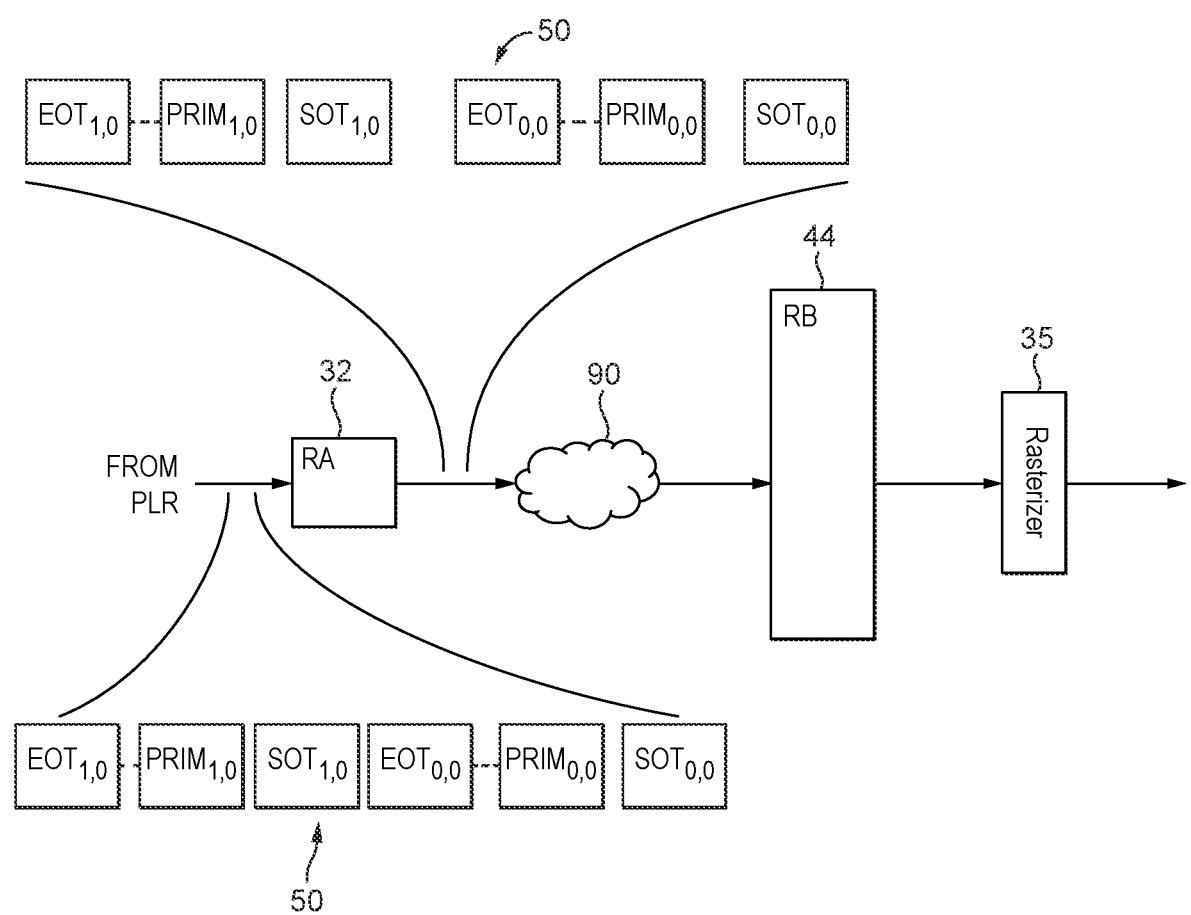
FIG. 5 shows an example of operation of the graphics processor and graphics processing pipeline of FIG. 3.

FIG. 5 illustrates this and shows schematically the resource allocator 32 passing a sequence 50 of tiles and primitives (PRIM), including appropriate start of tile (SOT) and end of tile (EOT) markers, to subsequent stages of the graphics processing pipeline, including the rasteriser buffer 44 and rasteriser 35 (these stages will be discussed further below). As shown in FIG. 5, the various commands, etc., for each tile are associated with the corresponding index for the tile in question, to denote which tile they apply to.

(For clarity purposes FIG. 5 (and FIGS. 6 to 9) only show a few tiles and a few primitives for each tile in the sequence of tiles and primitives that is sent from the polygon list reader to resource allocator and from the resource allocator to the subsequent stages of the graphics processing pipeline. As will be appreciated by those skilled in the art, for a given render output, there will typically be a much larger number of tiles in the sequence, and each tile will typically contain many more primitives, than are illustrated in FIGS. 5 to 9.)

As shown in FIG. 3, the sequence of tiles and primitives for the tiles are first provided by the resource allocator 32 to a vertex loader 33. The vertex loader reads the appropriate processed vertex data for primitives received from the resource allocator for primitives to be rendered from the memory 5, and provides the primitives (including their processed vertex data) to a triangle setup unit 34.

The triangle setup unit 34 performs primitive setup operations to set up the primitives to be rendered. This includes, for example, determining edge information representing the primitives' edges (e.g. from the vertices for the primitives), deriving barycentric functions for varying interpolation for the primitives, etc.

The so-"setup" primitives are then stored in a rasteriser buffer 44, which buffers primitives before they are sent to the rasteriser 35 for rasterising. This buffer may also facilitate reordering of the primitives in a sequence of primitives, e.g. for a given tile, as primitives can be issued from the rasteriser buffer 44 in a different order to the order in which they are received in that buffer.

The primitives are then passed from the rasteriser buffer 44 to the rasteriser 35 for rasterising. The rasteriser 35 is configured to rasterise primitives to sampling points and generates one or more graphics fragments having appropriate positions (representing appropriate sampling positions) for rendering the primitives it receives. It may use information representing the primitives' edges for this purpose, for example.

The fragments generated by the rasteriser 35 are then passed to a fragment processing stage or stages of the pipeline 36. The fragment processing that is performed on the fragments received from the rasteriser may comprise any suitable and desired processing that may be performed for fragments of a primitive. Thus this may include, for example, one or both of early and late depth and/or stencil testing of the fragments (of the sampling points that the fragments represent), blending of fragment data, texture mapping, etc.

In the present embodiments, the fragment processing includes at least performing fragment shading to generate output data values for fragments of primitives. The appropriate fragment shading to execute for a given primitive (and thus fragment) may be configured and indicated by the resource allocator 32 based on the corresponding state descriptor, e.g. for the draw call to which the primitive belongs.

Other fragment processing steps could also or instead be carried out if desired.

Also, as shown in FIG. 3, the fragment processing 36 has access to depth and stencil (ZS) buffers 45, that store depth and/or stencil values for use for depth and stencil tests, respectively.

The rendered fragments (the data for the rendered fragments) from the fragment processing 36 is written appropriately to a tile buffer 37.

The tile buffer 37 may be provided as part of RAM that is located on (local to) the graphics processor 3 (chip). The tile buffer 37 stores colour buffers that store an appropriate colour (and any other appropriate data) for each sampling point that the buffers represent (in essence for each sampling point of a tile that is being processed).

Once a tile has been processed, its data is written out 38 from the tile buffer 37 to the memory 5 (e.g. to a frame buffer 7 in the memory 5) for storage, and the next tile is then processed, and so on, until all the tiles have been processed to generate the entire render output (e.g. frame (image) to be displayed).

The process is then repeated for the next render output (e.g. frame) and so on.

Other arrangements for the graphics processor 3 and the graphics processing pipeline that it executes would, of course, be possible.

The above describes the basic operation of the graphics processor and graphics processing pipeline in the present embodiments when rendering a sequence of tiles (and primitives for those tiles) to generate a render output.

As discussed above, the technology described herein relates in particular to the situation where there is a graphics processing operation to be performed for the entirety of a rendering tile, before any "actual" primitives for the tile are rendered. The way that this is done in the present embodiments will now be described in more detail with reference to FIGS. 6 to 9.

(FIGS. 6 to 9 show the elements of the graphics processing pipeline that are relevant to this operation. Thus they show the resource allocator 32 receiving tiles and primitives for those tiles from the primitive list reader 31, the rasteriser buffer 44 that buffers primitives to be sent to the rasteriser 35, the rasteriser 35, and, schematically, the intermediate processing stages 60 (such as the vertex loader and triangle setup) between the resource allocator and the rasteriser buffer.)

The Applicants have recognised in this regard that there may, for example, be situations where it is desired to perform a graphics processing operation for the entirety of a render output being generated. Such operations may, for example, and in the present embodiments do, comprise loading depth and/or stencil values into a depth and/or stencil buffer for a render output before rendering that output, for example to preload the depth and/or stencil buffer with a set of default and/or previously determined depth and/or stencil values.

In the present embodiments, this is done by causing the primitive providing circuit 43, and in particular the resource allocator 32, to include appropriate primitives that will trigger the performing of the desired graphics processing operation for the entirety of a tile in the sequence of primitives and rendering tiles provided to the subsequent stages of the graphics processing pipeline (i.e. the vertex loader, etc.).

Furthermore, in the present embodiments, the primitive that triggers the performing of a graphics processing operation for the entirety of a tile to which the primitive relates has associated with it a condition such that the graphics processing operation to be performed for the entirety of the tile should only be performed if another primitive is to be processed for the tile to which the primitive that is to trigger the graphics processing operation for the entirety of the tile relates.

Moreover, in the present embodiments, the resource allocator 32 is triggered to include such "full tile" primitives in advance of the actual rendering tile to which they relate (i.e. before the "actual" primitives to be rendered (that will be read from the primitive list(s)) (if any) for the tile).

In the present embodiment, the inclusion of such "full tile" primitives in a sequence of primitives and tiles to be rendered by the resource allocator 32 is triggered by providing state (configuration) information indicating that such operation is required in the appropriate descriptor (the frame buffer descriptor) for the render output that is being generated. Then, when the resource allocator 32 reads the frame buffer descriptor for the render output being generated, it correspondingly recognises that it should operate to insert the appropriate full tile primitives for each tile of the render output in question, in advance of the actual tiles to which the full tile primitives relate.

In particular, the frame buffer descriptor for a given render output includes a field (a value) that when set to a particular value, indicates to the resource allocator that it should include in advance of each tile relating to the render output in question, a primitive that will trigger the performance of the graphics processing operation for the entirety of the tile, and that has associated with it a condition such that the graphics processing operation to be performed for the entirety of the tile should only be performed if another primitive is to be processed for the tile to which the primitive that is to trigger a graphics processing operation for the entirety of the tile relates. The frame buffer descriptor also indicates the maximum number of such primitives that can be in flight at any given time.

The operation in the present embodiments and as illustrated in FIGS. 6 to 9 is triggered, as discussed above, by and in response to the fragment shader endpoint 46 allocating tiles and issuing tiles for processing for a given render output to be generated.

In the present embodiments once a tile has been allocated a tile index by the fragment shader endpoint, as well as sending the tile to the primitive list reader 31 for list reading, the fragment shader endpoint 46 also notifies the resource allocator 32 that the tile has been allocated. The resource allocator 32 then checks the frame buffer descriptor for the render output being generated to determine whether a full tile primitive should be issued for the tile in question. If so, the resource allocator 32 operates to issue an additional tile that has associated with it the full tile primitive in question, to trigger the "full tile" processing operation for the allocated tile, before the primitive list reader has read the primitive lists to determine whether there are any actual primitives to be processed for the tile in question. This will then allow the full tile primitive for the tile to begin to be processed before the tile in question starts going through the primitive list reader 31.

As discussed above, each tile that is allocated for a render output will have a corresponding tile index, identifying that tile, and so the additional tile that is inserted in the sequence in advance for processing the full tile primitive for a tile will have the index for the tile in question (and thus will be followed by a second instance of that tile, having the same tile index, but then containing any primitives read by the primitive list reader 31 for the tile in question).

In general once the tiling is done (the primitive lists have been written into memory) for a render output, an appropriate "run fragment" command will be executed to trigger the rasterising and rendering for the output. In response to this, the render output (frame buffer) will be split into tasks and the tasks sent to the fragment shader endpoint 46. The fragment shader endpoint will then load the frame buffer descriptor for the render output in question and allocate a tile index or indices for a task. In this case it is assumed that the frame buffer descriptor indicates that early "full tile" processing is enabled. This will then trigger the resource allocator 32 to issue "full tile" primitives in advance of tiles containing "actual" primitives to be rendered.

Thus, once the fragment shader endpoint has allocated the first tile for a task, it will indicate the tile allocation to the resource allocator and send that first tile to the primitive list reader for primitive list reading. The resource allocator in response to the descriptor indicating that full tile primitive operation is required, will then issue a first instance of the first tile to perform the full tile primitive operation.

The fragment shader endpoint will then allocate the second tile in the sequence for the render output, and so indicate that tile allocation to the resource allocator and send that second tile to the primitive list reader for primitive list reading. The resource allocator will then issue another full tile primitive tile for the second tile in the sequence.

The fragment shader endpoint may then allocate the third tile in the sequence for the render output and correspondingly indicate that tile allocation to the resource allocator and send the tile to the primitive list reader for reading, with the resource allocator again then issuing a full tile primitive tile for that third tile.

This will (potentially) continue until the primitive list reading for the first tile has been completed by the primitive list reader, at which point the "first tile", with its actual primitives to be rendered (if any) will be sent to the resource allocator. At this point the resource allocator will include that first "actual tile" (i.e. the actual tile for the first tile in the sequence) in the sequence of tiles and primitives being provided to the subsequent graphics processing stages, for example following a sequence of several "full tile primitive" tiles.

This process will then be continued as and when "actual" tiles in the sequence are ready for processing (have completed their primitive list reading), and as "full tile" primitives for other tiles in the sequence fall to be issued.

In the present embodiments, as discussed above, the frame buffer descriptor includes and sets a limit on the maximum number of "full tile" primitive tiles that can be in flight (active) at any one time. Thus the resource allocator also controls its issuing of "full tile" primitives for tiles of the render output to ensure that that maximum is not exceeded, for example by waiting for an earlier "full tile" primitive to be finished with (e.g. its processing completed or it being fully discarded) before issuing a new "full tile" primitive for processing, as appropriate.

FIGS. 6 to 9 illustrate the above process. For ease of illustration, FIGS. 6 to 9 simply show an exemplary situation of the operation in respect of a full tile primitive for one particular rendering tile of the render output in question, but as will be appreciated by those skilled in the art, the corresponding operation may be, and will be, performed for each respective rendering tile of the render output, where the graphics processing operation to be performed for the entirety of the rendering tile should be performed for each and every rendering tile of the output.

Figure 6:
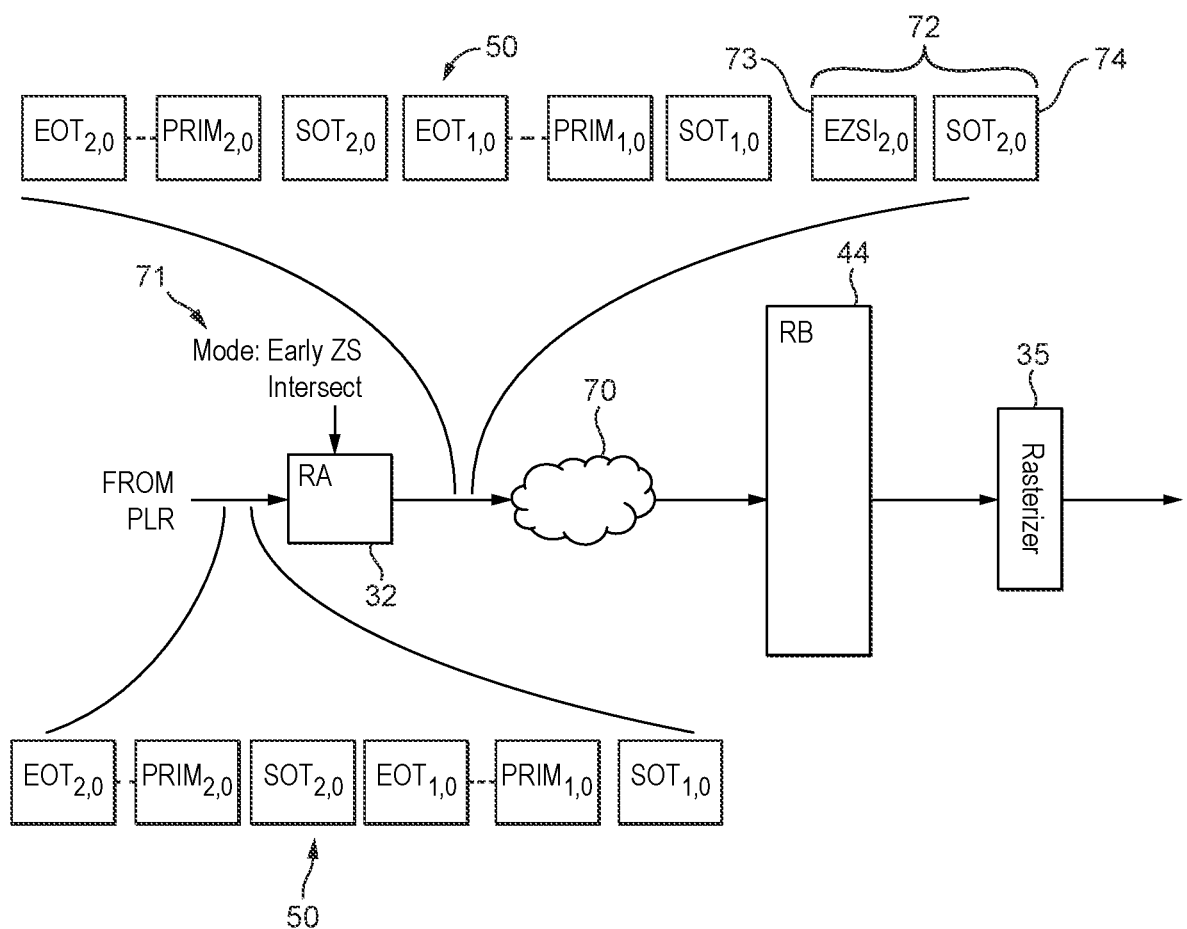
FIGS. 6 to 9 show the operation of the graphics processor and graphics processing pipeline of FIG. 3 in an embodiment.
Figure 7:
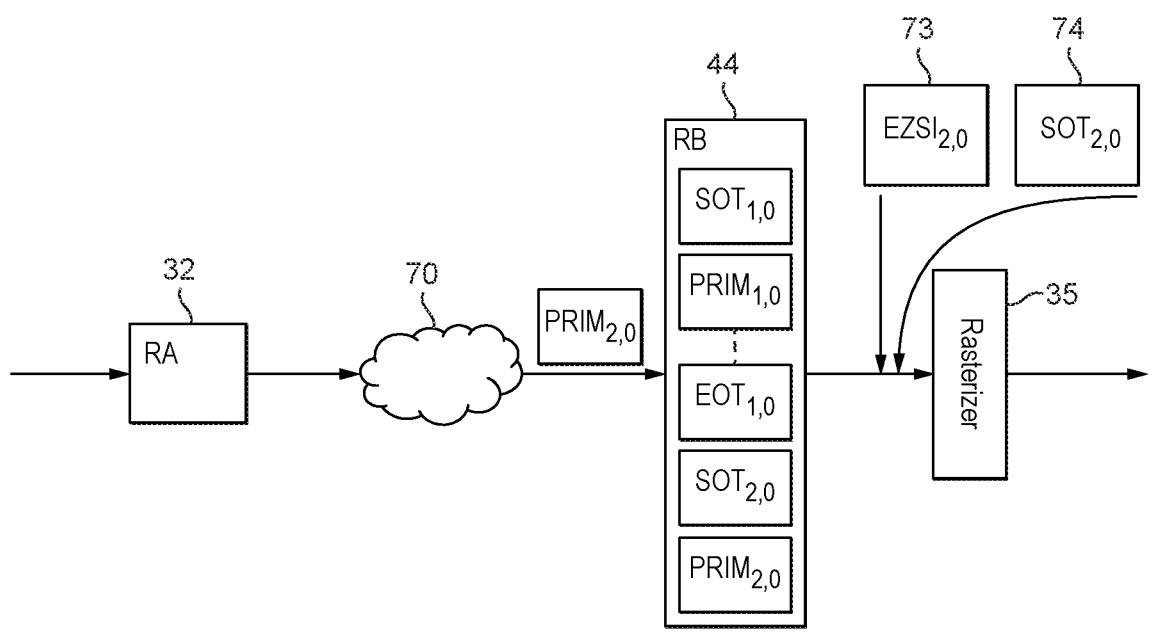

As shown in FIG. 6, in response to reading a frame buffer descriptor 71 for a render output being generated that indicates the need to include a full tile primitive, the resource allocator 32, in effect, inserts an additional tile 72 into the sequence of tiles received from the primitive list reader that has associated with it the full tile primitive 73 in question (that will trigger the graphics processing operation for the entirety of the tile for the tile in question) (other "full tile" operations would, of course, be possible). (The processing to be performed for the full tile primitive (and thus how to configure the graphics processing pipeline to perform that processing) is correspondingly determined by the resource allocator 32 from the frame buffer descriptor 71.)

This additional tile 72 will have the same tile index as the tile of the render output to which it relates (in the example shown in FIGS. 6 to 9, the tile index for the tile that the "full tile" primitive is being issued for is (2,0)). As shown in FIG. 6, in the present embodiments the additional tile 72 that triggers the full tile primitive processing is denoted using a "start of tile" marker only (unlike tiles that relate to (that comprise) primitives read from the primitive lists (i.e. "actual" primitives to be rendered), which are denoted, as shown in Figures using both start of tile and end of tile markers).

In the present embodiment, the graphics processing operation triggered by the full tile primitive is an early loading (a preloading) of the depth and stencil values for the tile in question (other "full tile" operations would, of course, be possible).

Thus, as shown in FIG. 6, the resource allocator 32 will insert in the sequence 50 of tiles and primitives that it sends to the subsequent processing stages of the pipeline (to the vertex loader, etc.), a start of tile marker (SOT) 74 followed by the conditional full tile primitive (EZSI) 73 that will trigger the "full tile" operation.

This therefore, in effect, inserts an additional tile into the sequence of tiles that is sent to the subsequent processing stages of the graphics processing pipeline for processing, which triggers the processing of the full tile primitive for the tile in question.

As shown in FIG. 6, this additional tile that triggers the processing of the full tile primitive will then be followed by further tiles (and sequences of "actual" primitives for those tiles) in the sequence of tiles making up the render output in question (which tiles are denoted in the sequence by means of appropriate start of tile and end of tile markers).

Once a "full tile" primitive has been issued by the resource allocator 32 in this way, then that primitive is processed by the subsequent processing stages of the graphics processing pipeline, without waiting for any determination of whether any other primitives will be processed for the tile to which the full tile primitive relates.

The "full-tile" primitive is processed in the same way as any other primitive for the graphics processor and graphics processing pipeline in question.

Thus, in the present embodiment, the "full-tile" primitive is first subjected to a triangle set up operation in the triangle set up unit 34, e.g. to generate barycentric functions for varying interpolation, and/or a set of edge functions for the primitive, before being passed to the rasteriser buffer 44.

Although the vertices for the full tile primitive for these (and other) processes could be explicitly indicated to the relevant processing stages, in the present embodiments the vertices for a full tile primitive are determined based on an assumption that the full tile primitive will occupy the entirety of the tile, e.g. by assuming the vertices are at the corners of the tile and/or of the overall render output.

The primitives (and the start and, where present, end of tile, markers) for the tiles in the sequence are buffered by the rasteriser buffer 44 before then being sent on to the rasteriser 35 for processing. Thus, as can be seen from FIG. 7, the tile for the full tile primitive (and the full tile primitive 73) is sent from the rasteriser buffer to the rasteriser for processing when its turn comes in the sequence of tiles and primitives being sent to the rasteriser.

The rasteriser 35 then rasterises the "full-frame" primitive to fragments covering the entire area of the region (tile) being processed, and provides those fragments to the fragment processing unit 36 for rendering. The fragment processing unit 36 then performs the desired graphics processing operation for the fragments.

In the present embodiment, the full-tile primitive has associated with it, and triggers, a fragment shading operation (a fragment shader) that performs the desired graphics processing operation (which in this case will be to fetch depth and stencil values from memory and load them into the ZS buffers 45).

Sometime later in the sequence of tiles for the render output being generated, the primitive list reader will read the primitive lists for the tile to which the earlier full tile primitive relates and will provide those primitives to the resource allocator, again identified by means of appropriate start of tile and end of tile markers.

The resource allocator 32 will then issue a second instance of the tile in question (i.e. having the same tile index as the additional tile 72 that triggered the "full tile" operation), to trigger the processing of the actual primitives (if any) for the tile in question.

Where there are "actual" primitives to be processed for the tile to which the full tile primitive relates, then those primitives will in time reach the rasteriser buffer 44 and the rasteriser 35 for processing and be processed in the normal manner, using, at least initially, the depth and stencil values that the earlier full tile primitive has previously loaded.

Figure 8:
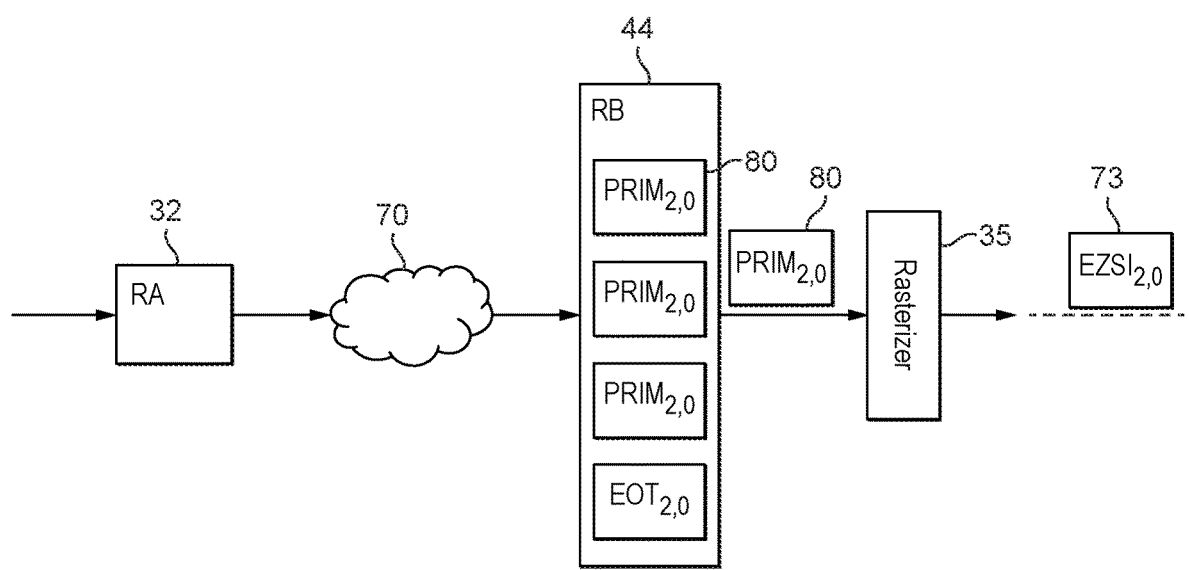

FIG. 8 illustrates this, and shows "actual" primitives 80 for the tile to which the full tile primitive 73 relates reaching the rasteriser buffer 44 (and accordingly then being passed on to the rasteriser 35 for processing).

In this case therefore, the earlier "full tile" primitive 73 for the tile in question will be fully processed through the graphics processing pipeline.

On the other hand, in the case where there are no other primitives to be processed for the tile to which the earlier full tile primitive relates, then the resource allocator is configured to recognise that it has not received any primitives for the tile from the primitive list reader for processing (i.e. that the tile does not contain any "actual" primitives to be processed) and to, in that event, signal later stages of the graphics processing pipeline to stop processing the earlier full-tile primitive for the tile.

In the present embodiment, the resource allocator recognises that it has not received any primitives for a tile from the primitive list reader when it receives the start and end of tile marker from the primitive list reader for the tile without there being any intervening primitives between those markers.

In particular, if the resource allocator receives a list for a tile from the primitive list reader that only contains start of tile and end of tile markers, it determines that the tile is "empty" (i.e. does not contain any actual primitives to be rendered), and then checks whether it has issued a conditional "full tile" primitive for the tile in question.

Figure 9:
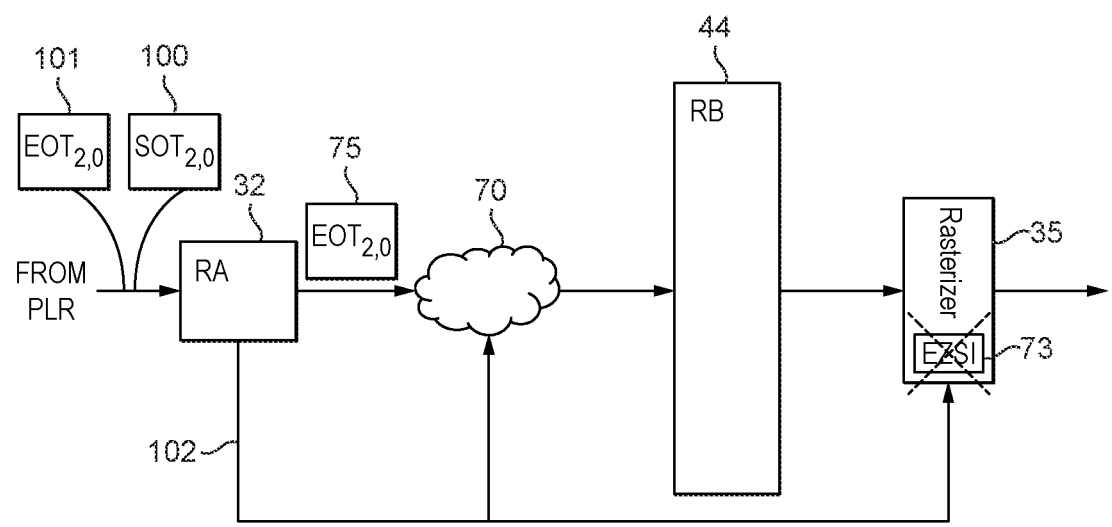

FIG. 9 illustrates this, and shows the resource allocator 32 receiving start of tile 100 and end of tile 101 markers for a tile for which an earlier full tile primitive 73 has been sent onwards through the graphics processing pipeline, without there being any "actual" primitives for the tile provided by the primitive list reader.

If the resource allocator does determine that it has issued a conditional "full tile" primitive for an "empty" tile, then in response to such a determination, as shown in FIG. 9, the resource allocator 32 broadcasts a signal 102 to the rasteriser 35 and one or more of the processing stages 70 intermediate the resource allocator and the rasteriser, to cause the rasteriser and those processing stages to stop any further processing of the full tile primitive for the tile (if they have already received it for processing) so far as they are able to. This then has the effect of culling processing of the earlier full tile primitive when it is later determined that processing of that primitive is in fact unnecessary.

The signal that is sent to the rasteriser, etc., to cause it to stop any processing of the full tile primitive includes an appropriate indication of the full tile primitive to which it relates (which in the present embodiments indicates the index of the tile for that primitive), and an indication to "kill" that full tile primitive.

Other arrangements would, of course, be possible.

In the present embodiment, this indication (signal) is in the form of a "primitive kill" vector which has one bit per tile for the render output. The resource allocator then sets the bit in that vector for the tile index of a tile for which the processing of the full frame primitive should be stopped (for which the full tile primitive is to be "killed").

The subsequent processing stages, such as the rasteriser, that are configured to receive any "full tile primitive kill" vector from the resource allocator are configured to check this vector when they process any conditional "full tile" primitives to determine if the primitive should be killed or not. To do this, the rasteriser, etc., considers the primitive type and tile index for each of the primitives that it is currently processing together with the full tile primitive kill vector to determine whether it is processing a "full tile" primitive for a tile that the "full tile" kill vector indicates should be killed. If so, the rasteriser (or other processing stage in question) attempts to stop any remaining processing that it is to perform in respect of the full tile primitive for the tile in question. (Other primitive types, even if for the same tile as a tile indicated to be killed for "full tile" primitive processing, or primitives from other tiles that are not indicated as to be killed, are not killed and are continued to be processed in the normal manner.)

In response to the signal to stop processing of a full tile primitive, the rasteriser (or other processing stage in question) attempts to stop any remaining processing that it is to perform in respect of the full tile primitive, by discarding (culling) the full-tile primitive from any further processing. This is done in the normal manner for discarding (e.g. culling) primitives from further processing in the graphics processor and graphics processing pipeline in question.

The processing stage, e.g. rasteriser, that receives the signal to stop processing the full tile primitive also operates to not send the full tile primitive whose processing is to be stopped to any further stages (e.g. a next stage) of the graphics processing pipeline. Thus, the rasteriser, for example, in response to a signal to stop processing a full tile primitive, will stop issuing fragments for the primitive (will not send any further fragments for the primitive to the fragment processing pipeline for processing).

In the present embodiments, as shown in FIG. 9, even in the case where it is determined that the processing of a full tile primitive should be stopped, an end of tile marker 75 for the tile that full frame primitive relates to is still passed through the graphics processing pipeline. This will then help to "clean up" any processing for a full tile primitive that is subsequently discarded, for example in the case where the full tile primitive has been partially passed on to subsequent stages of the graphics processing pipeline (e.g. beyond the rasteriser) before it was determined that processing of the full tile primitive was not necessary.

In the present embodiments this is done by the resource allocator, when it determines that a tile is "empty" (does not contain any actual primitives to be rendered) (as discussed above), as well as providing the "full tile primitive" "kill" indication, also inserting a "clean-up" end of tile indication (marker) 75 for the tile in question in the sequence of tiles and primitives that it sends onwards to the subsequent processing stages of the graphics processing pipeline, which end of tile indication is then passed through the graphics processing pipeline appropriately, to indicate to the stages of the graphics processing pipeline that there is no further processing for the tile in question (that the tile in question has finished). Only an end of tile indication is inserted for this purpose (a start of tile marker is not used).

Although the present embodiment has been described above by illustrating inserting and executing a full tile primitive for a single rendering tile in a sequence of rendering tiles for a render output, as discussed above, in the typical case, a "full tile" primitive will be issued and included for each rendering tile of a render output. In this case therefore, there will be one full tile primitive issued (in advance) for each tile making up the render output (e.g. frame) in question.

The graphics processor and graphics processing pipeline will accordingly process each rendering tile in the sequence, including the "full tile" primitive rendering tiles for the render output, until all the individual rendering tiles for the output have been rendered (and written out to the frame buffer 7). The process may then be repeated for the next render output (e.g. frame) to be generated, and so on.

It will be appreciated from the above that the technology described herein, in its embodiments at least, can provide a more efficient mechanism for handling primitives that are to trigger graphics processing operations for the entirety of rendering tiles and/or a render output, and in particular in the case where the processing operation need only be performed when another primitive is to be processed for the tile in question. This is achieved, in the embodiments of the technology described herein at least, by starting processing the "full tile" primitive without waiting for any determination of whether any other primitives will be processed for the tile in question, but then thereafter, culling (killing) the "full tile" primitive from further processing if it is subsequently determined that no other primitives will be processed for the tile to which the full tile primitive relates.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor when generating a render output using tile-based rendering, in which a plurality of tiles for a render output being generated are rendered separately, and the thus rendered tiles combined to form the render output, the graphics processor being operable to execute a graphics processing pipeline, the graphics processing pipeline including at least a primitive providing stage and one or more subsequent processing stages, wherein the primitive providing stage is operable to provide primitives to be processed for respective rendering tiles of a sequence of plural rendering tiles to the one or more subsequent processing stages for processing, and the one or more subsequent processing stages are operable to perform one or more processing operations in respect of primitives provided for processing by the primitive providing stage; the method comprising:

the primitive providing stage, when providing primitives to be processed for respective tiles of the sequence of plural rendering tiles to the one or more subsequent processing stages of the graphics processing pipeline for processing:

for a tile of the sequence of plural rendering tiles, including in a sequence of primitives for the sequence of plural rendering tiles being provided to the one or more subsequent processing stages of the graphics processing pipeline for processing, a primitive that will trigger the performance of a graphics processing operation for the entirety of the tile, and that has associated with it a condition such that the graphics processing operation to be performed for the entirety of the tile should only be performed if another primitive is to be processed for the tile to which the primitive that is to trigger the graphics processing operation for the entirety of the tile relates;

the primitive that will trigger the performance of the graphics processing operation for the entirety of the tile being included in the sequence of primitives for the sequence of plural rendering tiles at least one tile in advance of the tile to which the primitive that is to trigger the graphics processing operation for the entirety of the tile relates;

the method further comprising:

a subsequent processing stage of the one or more subsequent processing stages of the graphics processing pipeline processing the primitive that is to trigger the performance of the graphics processing operation for the entirety of the tile to which the primitive relates, without waiting for any determination of whether any other primitives will be processed for that tile; and when, subsequent to the starting of the processing of the primitive that is to trigger the performance of the graphics processing operation for the entirety of the tile, it is determined that no other primitives will be processed for the tile to which the primitive that is to trigger the performance of the graphics processing operation for the entirety of the tile relates, causing at least one of the one or more subsequent processing stages of the graphics processing pipeline to stop performing processing in respect of the primitive that is to trigger the performance of the graphics processing operation for the entirety of the tile.

2. The method of claim 1, wherein the primitive providing stage indicates the start of each tile in the sequence of plural rendering tiles that it provides to the subsequent processing stages of the graphics processing pipeline.

3. The method of claim 1, wherein the primitive providing stage comprises a primitive list reading stage that reads lists of primitives prepared for respective regions of a render output being generated to determine primitives to be processed for a rendering tile.

4. The method of claim 1, wherein the graphics processing operation that the primitive that will trigger the performance of the graphics processing operation for the entirety of the tile performs for the entirety of a tile is an operation to load data values that will then be used when rendering other primitives for the tile.

5. The method of claim 1, wherein:

the primitive providing stage comprises:

a primitive list reading stage that reads lists of primitives prepared for respective regions of a render output being generated to determine primitives to be processed for a rendering tile; and a resource allocator that receives primitives from the primitive list reader, and then provides the primitives to the one or more subsequent stages of the graphics processing pipeline for processing;

and the resource allocator includes the primitive that will trigger the performance of the graphics processing operation for the entirety of a tile in the sequence of primitives for the sequence of plural rendering tiles being provided to the one or more subsequent processing stages of the graphics processing pipeline.

6. The method of claim 1, comprising including the primitive that will trigger the performance of the graphics processing operation for the entirety of the tile in the sequence of primitives for the sequence of plural rendering tiles by including an additional tile in the sequence of plural rendering tiles, the additional tile comprising the primitive that will trigger the performance of the graphics processing operation for the entirety of the tile.

7. The method of claim 1, comprising determining, subsequent to the starting of the processing of the primitive that is to trigger the performance of the graphics processing operation for the entirety of the tile, that no other primitives will be processed for the tile to which the primitive that is to trigger the performance of the graphics processing operation for the entirety of the tile relates when there are no primitives listed in the primitive list(s) for the rendering tile.

8. The method of claim 1, wherein the step of causing at least one of the one or more subsequent processing stages of the graphics processing pipeline to stop performing processing in respect of the primitive that is to trigger the performance of the graphics processing operation for the entirety of the tile comprises providing an indication to the subsequent processing stage to indicate that processing of the primitive that is to trigger the performance of the graphics processing operation for the entirety of the tile should be stopped.

9. The method of claim 8, comprising providing the indication to a rasteriser of the graphics processing pipeline.

10. The method of claim 1, comprising when stopping performing processing in respect of the primitive that is to trigger the performance of the graphics processing operation for the entirety of the tile, still passing an end of tile marker for the tile that the primitive that is to trigger the performance of the graphics processing operation for the entirety of the tile relates to through the graphics processing pipeline.

11. A graphics processor operable to generate a render output using tile-based rendering, in which a plurality of tiles for a render output being generated are rendered separately, and the thus rendered tiles combined to form the render output, the graphics processor being operable to execute a graphics processing pipeline;

the graphics processing pipeline executed by the graphics processor comprising:

a primitive providing circuit configured to provide primitives to be processed for respective rendering tiles of a sequence of plural rendering tiles to one or more subsequent processing stages of the graphics processing pipeline for processing; and one or more processing stages operable to perform one or more processing operations in respect of primitives provided for processing by the primitive providing circuit subsequent to the primitive providing circuit;

wherein:

the primitive providing circuit is operable to, when providing primitives to be processed for respective tiles of the sequence of plural rendering tiles to the one or more subsequent processing stages of the graphics processing pipeline for processing:

for a tile of the sequence of plural rendering tiles, include in the sequence of primitives for the sequence of plural rendering tiles being provided to the one or more subsequent processing stages of the graphics processing pipeline for processing, a primitive that will trigger the performance of a graphics processing operation for the entirety of the tile, and that has associated with it a condition such that the graphics processing operation to be performed for the entirety of the tile should only be performed if another primitive is to be processed for the tile to which the primitive that is to trigger the graphics processing operation for the entirety of the tile relates; and include the primitive that will trigger the performance of the graphics processing operation for the entirety of the tile in the sequence of primitives for the sequence of plural rendering tiles at least one tile in advance of the tile to which the primitive that is to trigger the graphics processing operation for the entirety of the tile relates;

and the graphics processor is configured such that:

a subsequent processing stage of the one or more subsequent processing stages of the graphics processing pipeline, when it receives a primitive that is to trigger the performance of the graphics processing operation for the entirety of the tile to which the primitive relates, will process the primitive that is to trigger the performance of the graphics processing operation for the entirety of the tile to which the primitive relates, without waiting for any determination of whether any other primitives will be processed for that tile;

and such that:

when, subsequent to the starting of the processing of a primitive that is to trigger the performance of the graphics processing operation for the entirety of a tile, it is determined that no other primitives will be processed for the tile to which the primitive that is to trigger the performance of the graphics processing operation for the entirety of the tile relates, at least one of the one or more subsequent processing stages of the graphics processing pipeline will be caused to stop performing processing in respect of the primitive that is to trigger the performance of the graphics processing operation for the entirety of a tile.

12. The graphics processor of claim 11, wherein the primitive providing circuit is configured to indicate the start of each tile in the sequence of plural rendering tiles that it provides to the one or more subsequent processing stages of the graphics processing pipeline.

13. The graphics processor of claim 11, wherein the primitive providing circuit comprises a primitive list reading circuit configured to read lists of primitives prepared for respective regions of a render output being generated to determine primitives to be processed for a rendering tile.

14. The graphics processor of claim 11, wherein the graphics processing operation that the primitive that will trigger the performance of the graphics processing operation for the entirety of a tile performs for the entirety of a tile is an operation to load data values that will then be used when rendering other primitives for the tile.

15. The graphics processor of claim 11, wherein:

the primitive providing circuit comprises:

a primitive list reading circuit configured to read lists of primitives prepared for respective regions of a render output being generated to determine primitives to be processed for a rendering tile; and a resource allocator circuit configured to receive primitives from the primitive list reading circuit, and to provide the primitives to the one or more subsequent stages of the graphics processing pipeline for processing, and the resource allocator circuit is configured to include a primitive that will trigger the performance of the graphics processing operation for the entirety of a tile in the sequence of primitives for the sequence of plural rendering tiles being provided to the one or more subsequent processing stages of the graphics processing pipeline.

16. The graphics processor of claim 11, wherein the primitive providing circuit is configured to include a primitive that will trigger the performance of the graphics processing operation for the entirety of the tile in the sequence of primitives for the sequence of plural rendering tiles by including an additional tile in the sequence of plural rendering tiles, the additional tile comprising the primitive that will trigger the performance of the graphics processing operation for the entirety of the tile.

17. The graphics processor of claim 11, wherein the graphics processor is configured to determine that no other primitives will be processed for a tile to which a primitive that is to trigger the performance of the graphics processing operation for the entirety of the tile relates, when there are no primitives listed in the primitive list(s) for the rendering tile.

18. The graphics processor of claim 11, wherein the graphics processor is configured to cause at least one of the one or more subsequent processing stages of the graphics processing pipeline to stop performing processing in respect of the primitive that is to trigger the performance of the graphics processing operation for the entirety of a tile by providing an indication to the subsequent processing stage to indicate that processing of the primitive that is to trigger the performance of the graphics processing operation for the entirety of a tile should be stopped.

19. The graphics processor of claim 11, wherein the graphics processor is configured to, when stopping performing processing in respect of the primitive that is to trigger the performance of the graphics processing operation for the entirety of the tile, still pass an end of tile marker for the tile that the primitive that is to trigger the performance of the graphics processing operation for the entirety of a tile relates to through the graphics processing pipeline.

20. A non-transitory computer readable storage medium comprising computer software code which when executing on at least one processor performs a method of operating a graphics processor when generating a render output using tile-based rendering, in which a plurality of tiles for a render output being generated are rendered separately, and the thus rendered tiles combined to form the render output, the graphics processor being operable to execute a graphics processing pipeline, the graphics processing pipeline including at least a primitive providing stage and one or more subsequent processing stages, wherein the primitive providing stage is operable to provide primitives to be processed for respective rendering tiles of a sequence of plural rendering tiles to the one or more subsequent processing stages for processing, and the one or more subsequent processing stages are operable to perform one or more processing operations in respect of primitives provided for processing by the primitive providing stage; the method comprising:

the primitive providing stage, when providing primitives to be processed for respective tiles of the sequence of plural rendering tiles to the one or more subsequent processing stages of the graphics processing pipeline for processing:

for a tile of the sequence of plural rendering tiles, including in the sequence of primitives for the sequence of plural rendering tiles being provided to the one or more subsequent processing stages of the graphics processing pipeline for processing, a primitive that will trigger the performance of a graphics processing operation for the entirety of the tile, and that has associated with it a condition such that the graphics processing operation to be performed for the entirety of the tile should only be performed if another primitive is to be processed for the tile to which the primitive that is to trigger the graphics processing operation for the entirety of the tile relates;

the primitive that will trigger the performance of the graphics processing operation for the entirety of the tile being included in the sequence of primitives for the sequence of plural rendering tiles at least one tile in advance of the tile to which the primitive that is to trigger the graphics processing operation for the entirety of the tile relates;

the method further comprising:

a subsequent processing stage of the one or more subsequent processing stages of the graphics processing pipeline processing the primitive that is to trigger the performance of the graphics processing operation for the entirety of the tile to which the primitive relates, without waiting for any determination of whether any other primitives will be processed for that tile; and when, subsequent to the starting of the processing of the primitive that is to trigger the performance of the graphics processing operation for the entirety of the tile, it is determined that no other primitives will be processed for the tile to which the primitive that is to trigger the performance of the graphics processing operation for the entirety of the tile relates, causing at least one of the one or more subsequent processing stages of the graphics processing pipeline to stop performing processing in respect of the primitive that is to trigger the performance of the graphics processing operation for the entirety of the tile.

* * * * *